(12) United States Patent
Dion et al.

(10) Patent No.: US 10,970,963 B2
(45) Date of Patent: Apr. 6, 2021

(54) COIN OPERATED ENTERTAINMENT SYSTEM

(71) Applicant: TOUCHTUNES MUSIC CORPORATION, New York, NY (US)

(72) Inventors: Dominique Dion, Verdun Nun's Island (CA); Kenneth J. Fedesna, Hawthorn Woods, IL (US); Mark D. Loffredo, Green Oaks, IL (US); Edward J. Suchocki, Buffalo Grove, IL (US); Edward E. Pellegrini, Palatine, IL (US); Frank J. Pellegrini, Yorkville, IL (US); Edward F. Hicks, Dundee, IL (US); Cary M. Mednick, Rolling Meadows, IL (US)

(73) Assignee: TOUCHTUNES MUSIC CORPORATION, New York, NY (US)

( * ) Notice: Subject to any disclaimer, the term of this patent is extended or adjusted under 35 U.S.C. 154(b) by 2 days.

(21) Appl. No.: 16/351,551

(22) Filed: Mar. 13, 2019

(65) Prior Publication Data
US 2019/0206187 A1    Jul. 4, 2019

Related U.S. Application Data

(60) Continuation of application No. 15/485,427, filed on Apr. 12, 2017, now Pat. No. 10,249,139, which is a
(Continued)

(51) Int. Cl.
*G07F 17/32* (2006.01)
*G07F 17/30* (2006.01)
(Continued)

(52) U.S. Cl.
CPC ........ *G07F 17/3241* (2013.01); *A63F 13/213* (2014.09); *A63F 13/215* (2014.09);
(Continued)

(58) Field of Classification Search
CPC ...... A63F 13/12; A63F 13/213; A63F 13/215; A63F 13/35; A63F 13/814; A63F 13/87;
(Continued)

(56) References Cited

U.S. PATENT DOCUMENTS

| 3,710,137 A | 1/1973 | Stephens, Jr. |
| 3,807,541 A | 4/1974 | Kortenhaus |

(Continued)

FOREIGN PATENT DOCUMENTS

| AU | 5401299 | 4/2000 |
| CA | 2119184 | 9/1994 |

(Continued)

OTHER PUBLICATIONS

European Patent Office, "European Search Report," issued in connection with European Patent Application No. 08 00 5442, dated Jan. 15, 2009 (2 pages).
(Continued)

*Primary Examiner* — Omkar A Deodhar
*Assistant Examiner* — Ross A Williams
(74) *Attorney, Agent, or Firm* — Nixon & Vanderhye, P.C.

(57) ABSTRACT

This invention in certain example instances relates generally to coin-operated video entertainment systems. More particularly, certain exemplary aspects of the invention provide methods and/or systems for controlling access to a portable coin-operated interactive entertainment device that may be used to play video games and access other forms of entertainment as well as providing features via such portable coin-operated interactive entertainment devices.

20 Claims, 16 Drawing Sheets

Related U.S. Application Data continuation of application No. 14/861,304, filed on Sep. 22, 2015, now abandoned, which is a division of application No. 11/902,790, filed on Sep. 25, 2007, now Pat. No. 9,171,419, which is a continuation-in-part of application No. 11/624,008, filed on Jan. 17, 2007, now Pat. No. 9,330,529.

(51) Int. Cl.

| | | |
|---|---|---|
| *G06F 3/16* | (2006.01) | |
| *A63F 13/213* | (2014.01) | |
| *A63F 13/215* | (2014.01) | |
| *A63F 13/35* | (2014.01) | |
| *A63F 13/814* | (2014.01) | |
| *A63F 13/87* | (2014.01) | |
| *H04B 7/00* | (2006.01) | |
| *G07F 5/00* | (2006.01) | |
| *G06F 15/16* | (2006.01) | |

(52) U.S. Cl.
CPC ............ *A63F 13/35* (2014.09); *A63F 13/814* (2014.09); *A63F 13/87* (2014.09); *G06F 3/16* (2013.01); *G07F 17/305* (2013.01); *G07F 17/32* (2013.01); *G07F 17/3216* (2013.01); *G07F 17/3218* (2013.01); *G07F 17/3223* (2013.01); *G07F 17/3272* (2013.01); *G06F 15/16* (2013.01); *G07F 5/00* (2013.01); *H04B 7/00* (2013.01); *Y10T 70/5168* (2015.04)

(58) Field of Classification Search
CPC .......... G07F 5/18; G07F 17/305; G07F 17/32; G07F 17/3216; G07F 17/3218; G07F 17/3223; G07F 17/3241; G07F 17/3272; G07F 5/00; Y10T 70/5168; G06F 15/16; G06F 3/16; H04B 7/00
See application file for complete search history.

(56) References Cited

U.S. PATENT DOCUMENTS

| | | |
|---|---|---|
| 3,982,620 A | 9/1976 | Kortenhaus |
| 4,008,369 A | 2/1977 | Theurer et al. |
| 4,064,362 A | 12/1977 | Williams |
| 4,186,438 A | 1/1980 | Benson et al. |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam et al. |
| 4,413,260 A | 11/1983 | Siegel et al. |
| 4,521,014 A | 6/1985 | Sitrick |
| 4,528,643 A | 7/1985 | Freeny, Jr. |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza et al. |
| 4,588,187 A | 5/1986 | Dell |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki et al. |
| 4,696,527 A | 9/1987 | Ding et al. |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno et al. |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley et al. |
| 4,807,052 A | 2/1989 | Amano |
| 4,811,325 A | 3/1989 | Sharples, Jr. et al. |
| 4,814,972 A | 3/1989 | Winter et al. |
| 4,815,868 A | 3/1989 | Speicher |
| 4,825,054 A | 4/1989 | Rust et al. |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington et al. |
| 4,885,694 A | 12/1989 | Pray et al. |
| 4,905,279 A | 2/1990 | Nishio |
| 4,920,432 A | 4/1990 | Eggers et al. |
| 4,922,420 A | 5/1990 | Nakagawa et al. |
| 4,924,378 A | 5/1990 | Hershey et al. |
| 4,926,485 A | 5/1990 | Yamashita |
| 4,937,807 A | 6/1990 | Weitz et al. |
| 4,949,187 A | 8/1990 | Cohen |
| 4,953,159 A | 8/1990 | Hayden et al. |
| 4,956,768 A | 9/1990 | Sidi et al. |
| 4,958,835 A | 9/1990 | Tashiro et al. |
| 4,965,675 A | 10/1990 | Hori et al. |
| 4,977,593 A | 12/1990 | Balance |
| 4,999,806 A | 3/1991 | Chernow et al. |
| 5,008,814 A | 4/1991 | Mathur |
| 5,012,121 A | 4/1991 | Hammond et al. |
| 5,027,426 A | 6/1991 | Chiocca, Jr. |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru et al. |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbiter |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac et al. |
| 5,159,678 A | 10/1992 | Wengelski et al. |
| 5,163,131 A | 11/1992 | Row et al. |
| 5,166,886 A | 11/1992 | Molnar et al. |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk et al. |
| 5,197,094 A | 3/1993 | Tillery et al. |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |

(56) References Cited

U.S. PATENT DOCUMENTS

| | | |
|---|---|---|
| 5,315,161 A | 5/1994 | Robinson et al. |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval et al. |
| 5,341,350 A | 8/1994 | Frank et al. |
| 5,355,302 A | 10/1994 | Martin et al. |
| 5,357,276 A | 10/1994 | Banker et al. |
| 5,369,778 A | 11/1994 | San Soucie et al. |
| 5,375,206 A | 12/1994 | Hunter et al. |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers, II et al. |
| 5,428,252 A | 6/1995 | Walker et al. |
| 5,428,606 A | 6/1995 | Moskowitz |
| 5,431,492 A | 7/1995 | Rothschild et al. |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele et al. |
| 5,457,305 A | 10/1995 | Akel et al. |
| 5,465,213 A | 11/1995 | Ross |
| 5,465,329 A | 11/1995 | Whisler |
| 5,467,326 A | 11/1995 | Miyashita et al. |
| 5,469,370 A | 11/1995 | Ostrover et al. |
| 5,469,573 A | 11/1995 | McGill, III et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing et al. |
| 5,496,178 A | 3/1996 | Back |
| 5,499,921 A | 3/1996 | Sone |
| 5,511,000 A | 4/1996 | Kaloi et al. |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz, Jr. |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi et al. |
| 5,550,577 A | 8/1996 | Verbiest et al. |
| 5,554,968 A | 9/1996 | Lee |
| 5,555,244 A | 9/1996 | Gupta et al. |
| 5,557,515 A | 9/1996 | Abbruzzese et al. |
| 5,557,541 A | 9/1996 | Schulhof et al. |
| 5,557,724 A | 9/1996 | Sampat et al. |
| 5,559,505 A | 9/1996 | McNair |
| 5,559,549 A | 9/1996 | Hendricks et al. |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs et al. |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett et al. |
| 5,592,611 A | 1/1997 | Midgely et al. |
| 5,594,509 A | 1/1997 | Florin et al. |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich et al. |
| 5,623,666 A | 4/1997 | Pike et al. |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy et al. |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding, II |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,704,146 A | 1/1998 | Herring et al. |
| 5,708,811 A | 1/1998 | Arendt et al. |
| 5,712,976 A | 1/1998 | Falcon, Jr. et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers, II et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winsky et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong et al. |
| 5,774,527 A | 6/1998 | Handelman et al. |
| 5,774,668 A | 6/1998 | Choquier et al. |
| 5,774,672 A | 6/1998 | Funahashi et al. |
| 5,778,395 A | 7/1998 | Whiting et al. |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |

(56) References Cited

U.S. PATENT DOCUMENTS

| | | |
|---|---|---|
| 5,793,364 A | 8/1998 | Bolanos et al. |
| 5,793,980 A | 8/1998 | Glaser et al. |
| 5,798,785 A | 8/1998 | Hendricks et al. |
| 5,802,283 A | 9/1998 | Grady et al. |
| 5,802,558 A | 9/1998 | Pierce |
| 5,802,599 A | 9/1998 | Cabrera et al. |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg, Jr. et al. |
| 5,815,146 A | 9/1998 | Youden et al. |
| 5,825,884 A | 10/1998 | Zdepski et al. |
| 5,828,343 A | 10/1998 | MacDonald, Jr. et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin et al. |
| 5,851,149 A | 12/1998 | Xidos et al. |
| 5,854,887 A | 12/1998 | Kindell et al. |
| 5,857,020 A | 1/1999 | Peterson, Jr. |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd et al. |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell et al. |
| 5,884,298 A | 3/1999 | Smith, II et al. |
| 5,887,139 A | 3/1999 | Madison, Jr. et al. |
| 5,887,193 A | 3/1999 | Takahashi et al. |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy et al. |
| 5,914,712 A | 6/1999 | Sartain et al. |
| 5,915,094 A | 6/1999 | Kouloheris et al. |
| 5,915,238 A | 6/1999 | Tjaden |
| 5,917,537 A | 6/1999 | Lightfoot et al. |
| 5,917,835 A | 6/1999 | Barrett et al. |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson et al. |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba et al. |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya et al. |
| 5,953,429 A | 9/1999 | Wakai et al. |
| 5,956,716 A | 9/1999 | Kenner et al. |
| 5,959,869 A | 9/1999 | Miller et al. |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi et al. |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt et al. |
| 6,005,599 A | 12/1999 | Asai et al. |
| 6,008,735 A | 12/1999 | Chiloyan et al. |
| 6,009,274 A | 12/1999 | Fletcher et al. |
| 6,011,758 A | 1/2000 | Dockes et al. |
| 6,018,337 A | 1/2000 | Peters et al. |
| 6,018,726 A | 1/2000 | Tsumura |
| 6,021,386 A | 2/2000 | Davis et al. |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser et al. |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta, III et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |

(56) References Cited

U.S. PATENT DOCUMENTS

| | | |
|---|---|---|
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoilis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen et al. |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| D495,755 S | 9/2004 | Wurz et al. |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,012,534 B2 | 3/2006 | Chaco |
| 7,024,485 B2 | 4/2006 | Dunning et al. |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,160,132 B2 | 1/2007 | Phillips et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| D560,651 S | 1/2008 | Berkheimer et al. |
| 7,347,723 B1 | 3/2008 | Daily |
| D566,195 S | 4/2008 | Ichimura et al. |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,548,851 B1 | 6/2009 | Lau |
| 7,549,919 B1 | 6/2009 | Nathan et al. |
| 7,574,727 B2 | 8/2009 | Nathan et al. |
| 7,634,228 B2 | 12/2009 | White et al. |
| 7,647,613 B2 | 1/2010 | Drakoulis et al. |
| 7,657,910 B1 * | 2/2010 | McAulay ............ A63F 13/12 725/61 |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,937,724 B2 | 3/2011 | Clark et al. |
| 7,922,178 B2 | 4/2011 | Finocchio |
| D642,553 S | 8/2011 | Nathan et al. |
| 7,992,178 B1 | 8/2011 | Nathan et al. |
| 7,996,873 B1 | 8/2011 | Nathan et al. |
| 8,015,200 B2 | 9/2011 | Seiflein et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,165,318 B2 | 4/2012 | Nathan et al. |
| 8,214,874 B2 | 7/2012 | Nathan |
| D665,375 S | 8/2012 | Garneau et al. |
| 8,292,712 B2 | 10/2012 | Nathan et al. |
| 8,325,571 B2 | 12/2012 | Cappello et al. |
| 8,332,895 B2 | 12/2012 | Nathan et al. |
| 8,429,530 B2 | 4/2013 | Neuman et al. |
| 9,171,419 B2 | 10/2015 | Dion et al. |
| 9,330,529 B2 | 5/2016 | Fedesna et al. |
| 2001/0011262 A1 | 8/2001 | Hoyt |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |

(56) References Cited

U.S. PATENT DOCUMENTS

| | | |
|---|---|---|
| 2002/0002079 A1 | 1/2002 | Martin et al. |
| 2002/0002483 A1 | 1/2002 | Siegel et al. |
| 2002/0018074 A1 | 2/2002 | Buil et al. |
| 2002/0032603 A1 | 3/2002 | Yeiser |
| 2002/0040371 A1 | 4/2002 | Burgess |
| 2002/0045960 A1 | 4/2002 | Phillips |
| 2002/0113824 A1 | 8/2002 | Myers, Jr. |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0129371 A1 | 9/2002 | Emura et al. |
| 2002/0158130 A1 | 10/2002 | Pellaumail |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0014272 A1 | 1/2003 | Goulet et al. |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0037010 A1 | 2/2003 | Schmelzer |
| 2003/0041093 A1 | 2/2003 | Yamane et al. |
| 2003/0050058 A1 | 3/2003 | Walsh et al. |
| 2003/0064805 A1 | 4/2003 | Wells |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan |
| 2003/0101450 A1 | 5/2003 | Davidsson et al. |
| 2003/0104865 A1* | 6/2003 | Itkis ............... G07F 17/3239 463/39 |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0163388 A1 | 8/2003 | Beane |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2003/0233469 A1 | 12/2003 | Knowlson |
| 2004/0010800 A1 | 1/2004 | Goci |
| 2004/0025185 A1 | 2/2004 | Goci et al. |
| 2004/0044723 A1 | 3/2004 | Bell |
| 2004/0085334 A1 | 5/2004 | Reaney |
| 2004/0103150 A1 | 5/2004 | Ogdon et al. |
| 2004/0129774 A1 | 7/2004 | Utz |
| 2004/0145477 A1 | 7/2004 | Easter et al. |
| 2004/0148362 A1 | 7/2004 | Friedman |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0034084 A1 | 2/2005 | Ohtsuki |
| 2005/0044254 A1 | 2/2005 | Smith |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1* | 2/2006 | Nguyen ............... G07F 17/323 463/29 |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0240771 A1 | 10/2006 | Graves |
| 2006/0247064 A1 | 11/2006 | Nguyen et al. |
| 2006/0293773 A1 | 12/2006 | Nathan et al. |
| 2007/0025701 A1 | 2/2007 | Kawasaki et al. |
| 2007/0047198 A1 | 3/2007 | Crooijmans et al. |
| 2007/0086280 A1 | 4/2007 | Cappello et al. |
| 2007/0121430 A1 | 5/2007 | Nathan et al. |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0220580 A1 | 9/2007 | Putterman |
| 2007/0247979 A1 | 10/2007 | Brillon et al. |
| 2007/0275777 A1 | 11/2007 | Walker |
| 2008/0003881 A1 | 1/2008 | Wu |
| 2008/0005698 A1 | 1/2008 | Koskinen |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1* | 4/2008 | Kreloff ............... G07F 17/3218 463/39 |
| 2008/0137849 A1 | 6/2008 | Nathan |
| 2008/0141175 A1 | 6/2008 | Sama |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0275771 A1 | 11/2008 | Levine |
| 2008/0305738 A1 | 12/2008 | Khedouri et al. |
| 2009/0005165 A1 | 1/2009 | Arezina |
| 2009/0006993 A1 | 1/2009 | Tuli et al. |
| 2009/0030802 A1 | 1/2009 | Plotnick et al. |
| 2009/0037969 A1 | 2/2009 | Nathan |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0098925 A1 | 4/2009 | Gagner |
| 2009/0100092 A1 | 4/2009 | Seiflein et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0234914 A1 | 9/2009 | Mikkelsen et al. |
| 2009/0240721 A1 | 9/2009 | Giacalone, Jr. |
| 2009/0241061 A1 | 9/2009 | Asai et al. |
| 2009/0265734 A1 | 10/2009 | Dion et al. |
| 2009/0282491 A1 | 11/2009 | Nathan et al. |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0131558 A1 | 5/2010 | Logan et al. |
| 2010/0211818 A1 | 8/2010 | Nathan et al. |
| 2010/0211872 A1 | 8/2010 | Rolston |
| 2010/0241259 A1 | 9/2010 | Nathan |
| 2010/0247081 A1 | 9/2010 | Victoria Pons |
| 2010/0269066 A1 | 10/2010 | Nathan et al. |
| 2010/0299232 A1 | 11/2010 | Nathan et al. |
| 2010/0306179 A1 | 12/2010 | Lim |
| 2011/0055019 A1 | 3/2011 | Coleman |
| 2011/0066943 A1 | 3/2011 | Brillon et al. |
| 2011/0111489 A1 | 5/2011 | Beese et al. |
| 2011/0173521 A1 | 7/2011 | Horton et al. |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |

(56) References Cited

U.S. PATENT DOCUMENTS

| | | | |
|---|---|---|---|
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0323654 A1 | 12/2012 | Writer |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |
| 2016/0012677 A1 | 1/2016 | Dion et al. |
| 2017/0216730 A1 | 8/2017 | Dion et al. |

FOREIGN PATENT DOCUMENTS

| | | |
|---|---|---|
| CN | 1340939 | 3/2002 |
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 2122799 | 1/1984 |
| EP | 0140593 | 5/1985 |
| EP | 0256921 | 2/1988 |
| EP | 2602352 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 2808906 | 11/2001 |
| EP | 1170951 | 1/2002 |
| EP | 1288802 | 3/2003 |
| EP | 1408427 | 4/2004 |
| EP | 1549919 | 7/2005 |
| EP | 1962251 | 8/2008 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 3/1993 |
| GB | 2380377 | 4/2003 |
| GB | 2505584 | 3/2014 |
| JP | S57-173207 | 10/1982 |
| JP | S58-179892 | 10/1983 |
| JP | S60-253082 | 12/1985 |
| JP | S61-84143 | 4/1986 |
| JP | S62-192849 | 8/1987 |
| JP | S62-284496 | 12/1987 |
| JP | S63-60634 | 3/1988 |
| JP | H02-153665 | 6/1990 |
| JP | H05-74078 | 3/1993 |
| JP | H05-122282 | 5/1993 |
| JP | H06-127885 | 5/1994 |
| JP | H07-504517 | 5/1995 |
| JP | H07-281682 | 10/1995 |
| JP | H07-311587 | 11/1995 |
| JP | H08-37701 | 2/1996 |
| JP | H08-274812 | 10/1996 |
| JP | H08-279235 | 10/1996 |
| JP | 3034555 | 11/1996 |
| JP | H08-289976 | 11/1996 |
| JP | H09-28918 | 2/1997 |
| JP | H09-114470 | 5/1997 |
| JP | H09-127964 | 5/1997 |
| JP | H09-244900 | 9/1997 |
| JP | H10-98344 | 4/1998 |
| JP | H10-222537 | 8/1998 |
| JP | H11-3088 | 1/1999 |
| JP | H11-24686 | 1/1999 |
| JP | H11-95768 | 4/1999 |
| JP | 2000-270314 | 9/2000 |
| JP | 2002-537584 | 11/2002 |
| JP | 2003-076380 | 3/2003 |
| JP | 2003-084903 | 3/2003 |
| JP | 2003-099072 | 4/2003 |
| JP | 2002-83640 | 9/2003 |
| JP | 2004-29459 | 1/2004 |
| JP | 2004-030469 | 1/2004 |
| JP | 2004-054435 | 2/2004 |
| JP | 2007-034253 | 2/2004 |
| JP | 2007-041722 | 2/2004 |
| JP | 2005-018438 | 1/2005 |
| JP | 2005-107267 | 4/2005 |
| JP | 2005-184237 | 7/2005 |
| JP | 2005-215209 | 8/2005 |
| JP | 2006-39704 | 2/2006 |
| JP | 2006-048076 | 2/2006 |
| JP | 2007-505410 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007-179333 | 7/2007 |
| JP | 2007-199775 | 8/2007 |
| JP | 2007-241748 | 9/2007 |
| JP | 2008-058656 | 3/2008 |
| JP | 2009-017529 | 1/2009 |
| JP | 2009-075540 | 4/2009 |
| JP | 2009-288702 | 12/2009 |
| TW | 514511 | 12/2002 |
| TW | M274284 | 9/2005 |
| TW | M290206 | 5/2006 |
| WO | 86/01326 | 2/1986 |
| WO | 90/00429 | 1/1990 |
| WO | 90/07843 | 7/1990 |
| WO | 91/08542 | 6/1991 |
| WO | 91/20082 | 12/1991 |
| WO | 93/16557 | 8/1993 |
| WO | 93/18465 | 9/1993 |
| WO | 93/21732 | 10/1993 |
| WO | 94/03894 | 2/1994 |
| WO | 94/14273 | 6/1994 |
| WO | 94/15306 | 7/1994 |
| WO | 94/15416 | 7/1994 |
| WO | 95/03609 | 2/1995 |
| WO | 95/29537 | 11/1995 |
| WO | 96/12255 | 4/1996 |
| WO | 96/12256 | 4/1996 |

(56) References Cited

FOREIGN PATENT DOCUMENTS

| | | |
|---|---|---|
| WO | 96/12257 | 4/1996 |
| WO | 96/12258 | 4/1996 |
| WO | 98/07940 | 2/1998 |
| WO | 98/11487 | 3/1998 |
| WO | 98/45835 | 10/1998 |
| WO | 99/35753 | 7/1999 |
| WO | 01/00290 | 1/2001 |
| WO | 01/08148 | 2/2001 |
| WO | 01/71608 | 9/2001 |
| WO | 01/84353 | 11/2001 |
| WO | 02/060546 | 8/2002 |
| WO | 02/095752 | 11/2002 |
| WO | 03/005743 | 1/2003 |
| WO | 03/069613 | 8/2003 |
| WO | 03/098382 | 11/2003 |
| WO | 2004/029775 | 4/2004 |
| WO | 2005/026916 | 3/2005 |
| WO | WO 2005/052751 A2 | 6/2005 |
| WO | 2006/014739 | 2/2006 |
| WO | 2006/056933 | 6/2006 |
| WO | WO 2006/106631 | 10/2006 |
| WO | 2006/138064 | 12/2006 |
| WO | WO 2007/069143 | 6/2007 |
| WO | 2007/092542 | 8/2007 |
| WO | 2008/033853 | 3/2008 |
| WO | WO 2009/004531 A1 | 1/2009 |
| WO | 2011/094330 | 8/2011 |
| WO | 2013/040603 | 3/2013 |

OTHER PUBLICATIONS

Grimes, Galen A., "Chapter 18, Taking Advantage of Web-Based Audio," pp. 1-21, retrieved on Mar. 24, 2000.
Koskelainen, Petri, "Report on Streamworks (tm)," Aug. 1995, pp. 1-4.
Stevens, W. Richard, "TCP/IP Illustrated," vol. 1, 1994, The Protocols, Chapter 2, pp. 22 and 27, and Chapter 17, pp. 223-229.
A Brochure entitled "About ECast," at least as early as Sep. 25, 2007, retrieved from www.ecastinc.com (1 page).
Definition of "Dynamically," Merriam Webster's Collegiate Dictionary, 1999 Tenth Edition, Merriam-Webster, Inc., p. 361.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
Drews, C.; Pestoni, F.; "Virtual jukebox: reviving a classic," Proceedings of the 35th Annual Hawaii International Conference System Sciences, pp. 887-893, Jan. 7-10, 2002.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
IBM Technical Disclosure Bulletin, vol. 41, No. 1, Jan. 1998, "Safe Mechanism for Installing Operating System Updates with Applications," pp. 557-559.
Johnny Rockets Name That Tune [online], [retrieved Mar. 7, 2002]. Retrieved from the Internet: <http://www.johnnyrockets.com/docs/funstuff.html>.
Kraiss et al., "Integrated document caching and prefetching in storage hierarchies based on Markov chain predictions", The VLDB Journal, vol. 7, issue 3, pp. 141-162, 1998.
Ludescher et al., "File Storage Management for TFTF physics data", IEEE, pp. 856-859, 1992.
Merriam Webster's Collegiate Dictionary, Ninth Edition, Merriam Webster, Inc., p. 1148, 1986 (definition of "Stand").
Mickey B's Jukebox Revue—Name That Tune! [online], [retrieved Jul. 23, 2001]. Retrieved from the Internet: <http://mickeyb.com/tune/>.
Peter Pawlowski, "Basic Player Whose Appearance and Functions can be Customized Freely 'Foobar 2000' v1.0 is Unveiled," Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commercial Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Sprague et al., "Music selection using the party vote democratic Jukebox", ACM AVI, pp. 433-436, 2008.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al.,"Information Jukebox A semi-public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
Yuki Murata, iTunes no 'Kankyo Settei' Catalog & Tips 10 Sen, Mac People, ASCII Corporation, Oct. 1, 2007.
"Darts Revolution Again", Replay Magazine, Mar. 1991, pp. 146-148.
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Bonczek et al, "The DSS Development System", 1983 National Computer Conference, Anaheim, California, May 16-19, 1983, pp. 441-455.
Derfler et al., "How Networks Work", Millennium Ed., Que Corporation, Jan. 2000.
Gralla, "How the Internet Works", Millennium Ed., Que Corporation, Aug. 1999.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
ITouch 27 New Games brochure, JVL Corporation, 2005, 2 pages.
ITouch 8 Plus brochure, JVL Corporation, 2005, 2 pages.

(56) References Cited

OTHER PUBLICATIONS

Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
European Search Report issued for European Application No. 08000845.1-1238/1962251, dated Apr. 3, 2009.
Canadian Office Action Application No. 2,881,533 dated Aug. 30, 2016.
Examiner's Report in related Canadian Application No. 2,881,503 dated Mar. 17, 2016.
Office Action in related U.S. Appl. No. 11/902,658 dated Jun. 29, 2016.
Office Action in related U.S. Appl. No. 12/929,466 dated Apr. 14, 2016.
European Examination Report dated Aug. 17, 2016 in European Appln No. 12 075 107.8.
Japanese Office Action in JP Appln. No. 2015-165266 dated Oct. 18, 2016.
Dion, et al., Office Action dated Mar. 10, 2017, issued in parent U.S. Appl. No. 14/861,304, filed Sep. 22, 2015.
U.S. Appl. No. 15/485,427, filed Apr. 12, 2017, 2017/0216730, Coin Operated Entertainment System.
U.S. Appl. No. 12/076,761, filed Mar. 21, 2009, 2006/0239887 U.S. Pat. No. 9,953,481, Jukebox With Associated Video Server.
U.S. Appl. No. 14/311,511, filed Jun. 23, 2014, 2014-0304117, Digital Downloading Jukebox System With Central and Local Music Servers.
U.S. Appl. No. 13/336,866, filed Dec. 23, 2011, 2012-0095910 U.S. Pat. No. 10,089,613, Digital Downloading Jukebox System With Central and Local Music Servers.
U.S. Appl. No. 14/729,267, filed Jun. 3, 2015, 2015-0312532, Digital Jukebox Device With Improved User Interfaces, and Associated Methods.
U.S. Appl. No. 11/624,008, filed Jan. 17, 2007, 2008/0171594 U.S. Pat. No. 9,330,529, Coin Operated Game Terminal.
U.S. Appl. No. 14/854,426, filed Sep. 15, 2015, 2016/0005103 U.S. Pat. No. 9,430,797, Digital Downloading Jukebox System With User-Tailored Music Management, Communications, and Other Tools.
U.S. Appl. No. 14/857,864, filed Sep. 18, 2015, 2016/0007072 U.S. Pat. No. 9,513,774, Digital Downloading Jukebox System With User-Tailored Music Management, Communications, and Other Tools.
U.S. Appl. No. 14/861,304, filed Sep. 22, 2015, 2016/0012677, Coin Operated Entertainment System.
U.S. Appl. No. 14/883,885, filed Oct. 15, 2015, 2016/0034873, Digital Downloading Jukebox System With Central and Local Music Servers.
U.S. Appl. No. 14/918,819, filed Oct. 21, 2015, 2016/0048273 U.S. Pat No. 9,436,356, Digital Downloading Jukebox System With User-Tailored Music Management, Communications, and Other Tools.
U.S. Appl. No. 10/661,811, filed Sep. 15, 2003, 2005/0060405 U.S. Pat. No. 9,646,339, Digital Downloading Jukebox System With Central and Local Music Servers.
U.S. Appl. No. 13/887,645, filed May 6, 2013, 2013/0318441, Jukebox With Customizable Avatar.
U.S. Appl. No. 11,902,658, filed Sep. 24, 2007, 2008/0086379, Digital Downloading Jukebox With Enhanced Communication Features.
U.S. Appl. No. 11/902,790, filed Sep. 25, 2007, 2008/016887 U.S. Pat. No. 9,171,419, Coin Operated Entertainment System.

\* cited by examiner

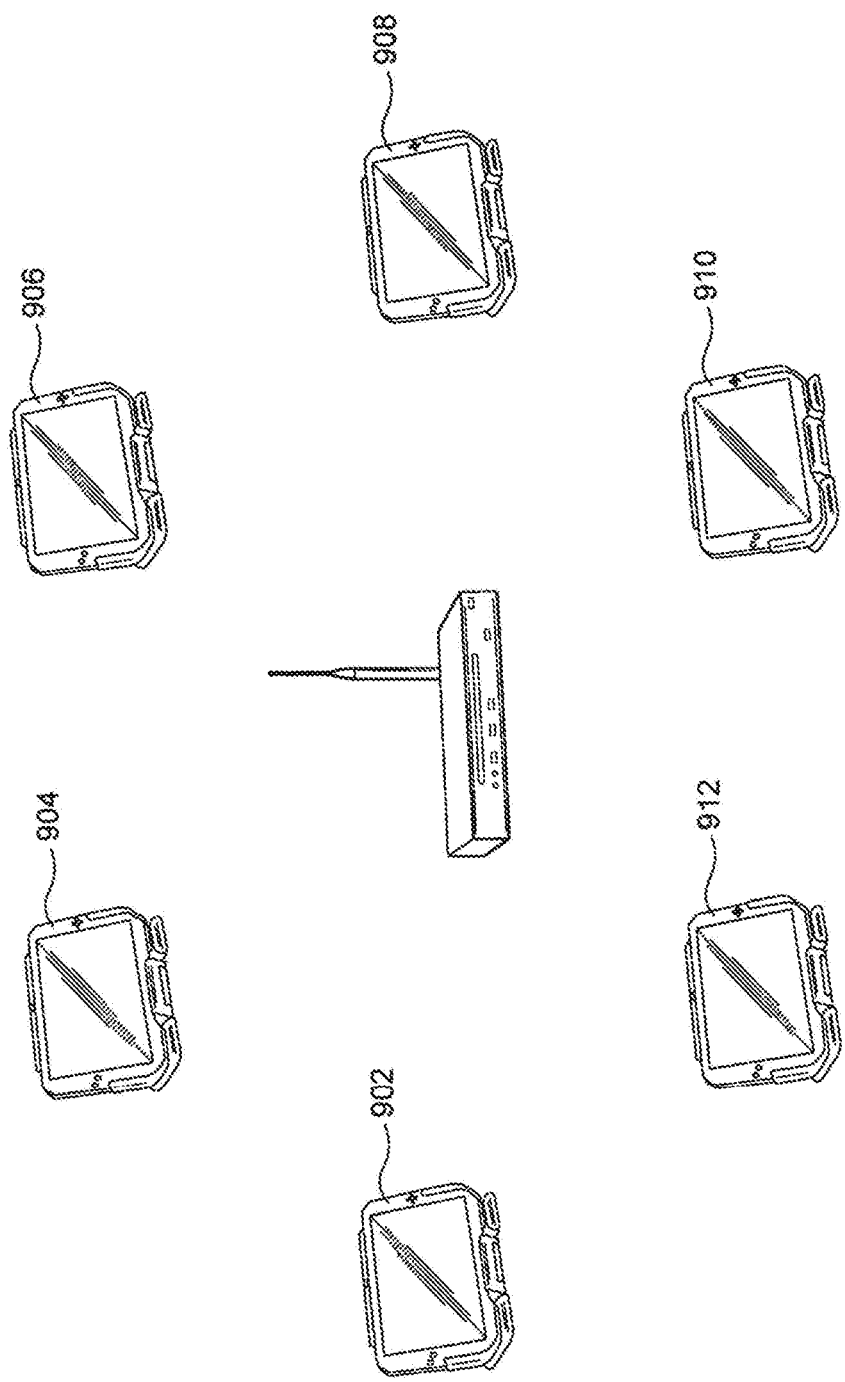

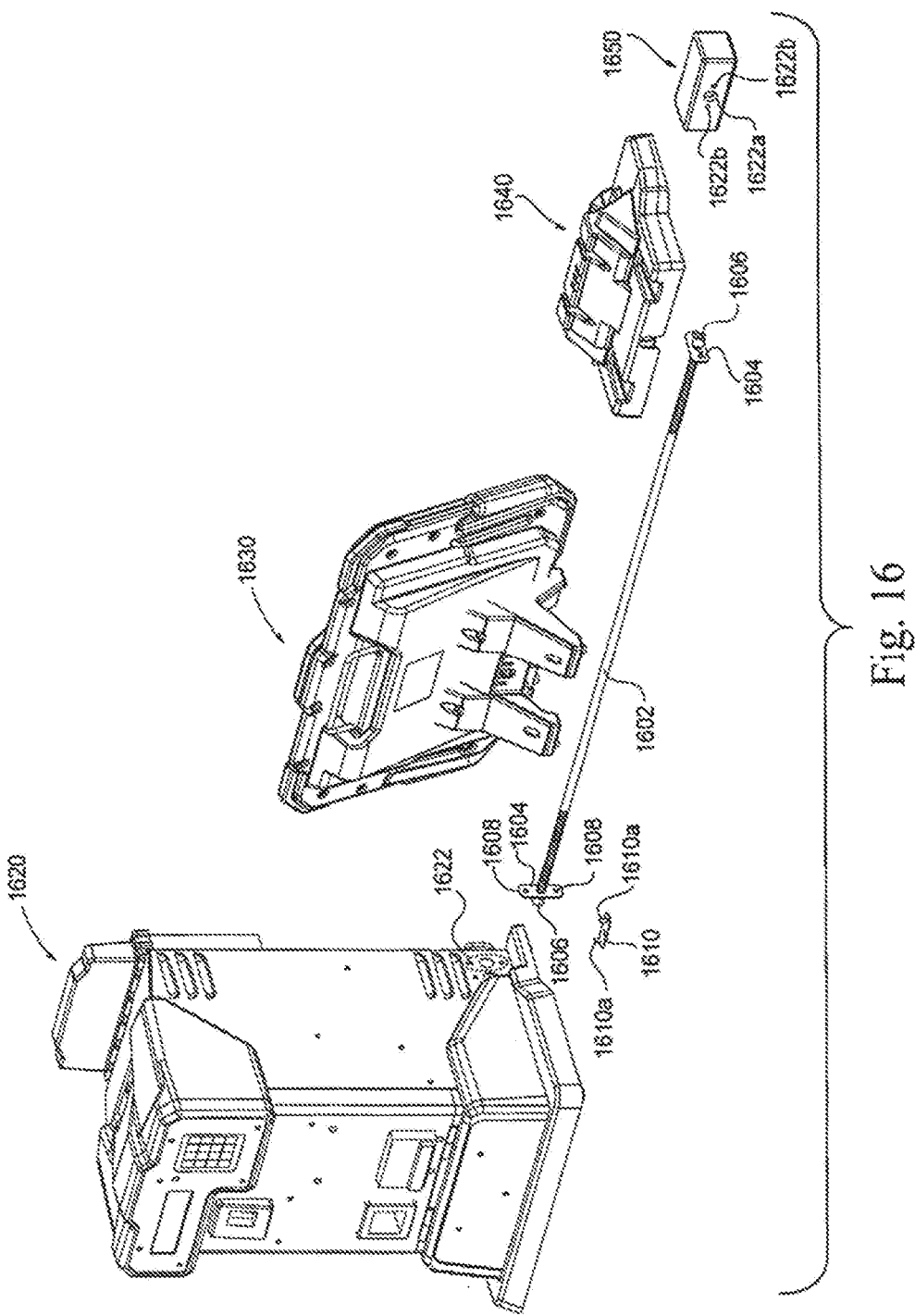

COIN OPERATED ENTERTAINMENT SYSTEM

CROSS-REFERENCE TO RELATED APPLICATIONS

This application is a Continuation of U.S. patent application Ser. No. 15/485,427 filed Apr. 12, 2017, which is a Continuation of U.S. patent application Ser. No 14/861,304 filed Sep. 22, 2015 (now abandoned), which is a Divisional of U.S. patent application Ser. No. 11/902,790 filed Sep. 25, 2007 (now U.S. Pat. No. 9,171,419 issued Oct. 27, 2015), which is the Continuation-In-Part of U.S. patent application Ser. No. 11/624,008 filed Jan. 17, 2007 (now U.S. Pat. No. 9,330,529 issued May 3, 2016), the entire contents of each of which are hereby incorporated by reference.

TECHNICAL FIELD

This invention in certain example instances relates generally to coin-operated video entertainment systems. More particularly, certain exemplary aspects of the invention provide methods and/or systems for controlling access to a portable coin-operated interactive entertainment device that may be used to play video games and access other forms of entertainment (such as music) as well as providing features via such portable coin-operated interactive entertainment devices.

BACKGROUND AND SUMMARY

Coin-operated video game devices have become common in restaurants and bars. Coin-operated video game devices are large devices or devices that are secured to a table or other stationary object. One or more players may use a coin-operated video game device to play trivia games, card games, and/or other common games. Because of the value of such devices, they are designed to be stationary to prevent theft. Among other disadvantages, stationary coin-operated video game devices tend to be underutilized because users are required to be at the fixed location of the devices, which may not necessarily be in the best playing location for maximizing earnings. The large devices also reduce acceptance due to limited space at the location for such.

Some restaurants and bars have distributed non-coin operated portable communication devices that are configured to allow users to play trivia and card games. Because the devices are portable, risk of theft is a concern. In order to reduce losses due to theft, such devices are designed to be inexpensive and have reduced processing and display capabilities. The reduced processing and display capabilities result in a less than optimal experience for users.

Therefore, it will be appreciated that there is a need in the art for portable coin-operated video entertainment systems and/or methods that provide rich multimedia experiences while also controlling access to the portable components.

Certain exemplary aspects of the invention overcome one or more of the above-described and/or other problems and/or limitations by providing portable coin-operated interactive entertainment game systems and/or methods.

Portable interactive entertainment devices may include touch screens or other input means and allow users to play video games, access other forms of entertainment, and access data and/or devices connected to a local area network or a wide area network. In various exemplary embodiments, portable interactive entertainment devices are removably secured to one or more stands. Each portable interactive entertainment device and/or a central tower may be configured to receive payment and. The payment may be in the form of currency credit card, debit card, cash or other form of payment (or deposit). Portable interactive entertainment devices can become unsecured from stands in response to the receipt of payment and/or a deposit, or remote controls operated by the location's employees.

In certain exemplary embodiments, portable interactive entertainment devices may be configured to allow users to listen to music, gamble, order food, access the internet, play movies, watch TV, send messages and personal ads, participate in tournaments, order merchandise, make phone calls, view advertising, access and participate in other forms of entertainment, etc.

In certain exemplary embodiments, a locking system for a movable coin-operated handheld entertainment device and a dock station therefore is provided. On the handheld device, there is provided a spring-loaded control pin, a spring-loaded ground pin, a spring-loaded power pin, and at least one locking hook extending downwardly from a bottom surface of the handheld device. The control pin extends to a depth shallower than that of the ground pin and the power pin. On the dock, there is provided a plurality of stationary dock contacts for respectively receiving each of the pins of the handheld device, and at least one locking channel, with each said locking channel being arranged so as to respectively receive one said locking hook.

In connection with certain of these exemplary embodiments, the dock may further comprise a slide solenoid assembly including at least one protrusion with a barb formed on an upward facing end thereof arranged so as to pass through at least one locking channel and at least one locking hook corresponding to the at least one locking channel, and a locking solenoid assembly for locking the slide solenoid assembly in place. The locking system of claim 2, wherein The locking solenoid assembly may be configured to lock the slide solenoid assembly independent of whether power is provided to the dock and/or handheld device. Programmed logic circuitry may be configured to disengage the locking system when a valid deposit is provided to a deposit acceptor provided to the handheld device and/or the dock and/or when a signal is received from a remote control being operated by an authorized user. The locking system of claim 2, wherein The locking solenoid assembly and/or the slide solenoid assembly may include an electromagnet and/or a spring.

In certain exemplary embodiments, a security system for a movable coin-operated handheld entertainment device being operated at a location is provided. A transceiver is located on the device configured to emit a signal indicative of its location. A transceiver is located proximate to an entryway/exit of the location configured to detect signals emitted by the device. Distance determining programmed logic circuitry is configured to determine a distance between the device and the entryway/exit of the location in dependence on the signal. Alarm programmed logic circuitry is configured to raise a alarm in dependence on the distance. The at least one characteristic of the alarm is determined by the alarm programmed logic circuitry in dependence on the distance.

In connection with certain of these exemplary embodiments, a timer may be configured to determine an amount of time the device is within a predetermined distance from the entryway/exit of the location, and the alarm programmed logic circuitry is configured to wait a predetermined amount of time before raising an alarm. A speaker may be configured to emit a beep at one of a plurality of intensities in dependence on a signal received from the alarm programmed logic circuitry and/or a strobe light configured to flash at one of a plurality of intensities in dependence on a signal received from the alarm programmed logic circuitry.

In certain exemplary embodiments, there is provided a digital jukebox comprising at least one removable coin-operated handheld entertainment device, wherein each said device is configured to be used both as a remote interface to the jukebox and/or as a stand-alone jukebox in a confined area in dependence on a mode chosen by a user of the jukebox.

In connection with certain of these exemplary embodiments, releasing programmed logic circuitry may be configured to release the device from the jukebox when a valid deposit is provided to a deposit acceptor provided to the jukebox, and/or the device and/or when a signal is received from a remote control being operated by an authorized user. The device may include directional speakers.

Certain exemplary embodiments may include or utilize computer-executable instructions for performing one or more of the disclosed methods. The computer-executable instructions may be stored on a computer-readable medium, such as a portable memory drive or optical disk. Also, the various components may be arranged in any suitable form of programmed logic circuitry, such as, for example, hardware, software, firmware, and/or any suitable combination thereof.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 15 illustrates an exemplary embodiment that includes a group of portable interactive entertainment devices, without a central tower, in accordance with an exemplary embodiment; and FIG. 16 shows how a field-configurable tether may be used in connection with certain exemplary embodiments.

DETAILED DESCRIPTION OF EXEMPLARY EMBODIMENTS

Figure 1:
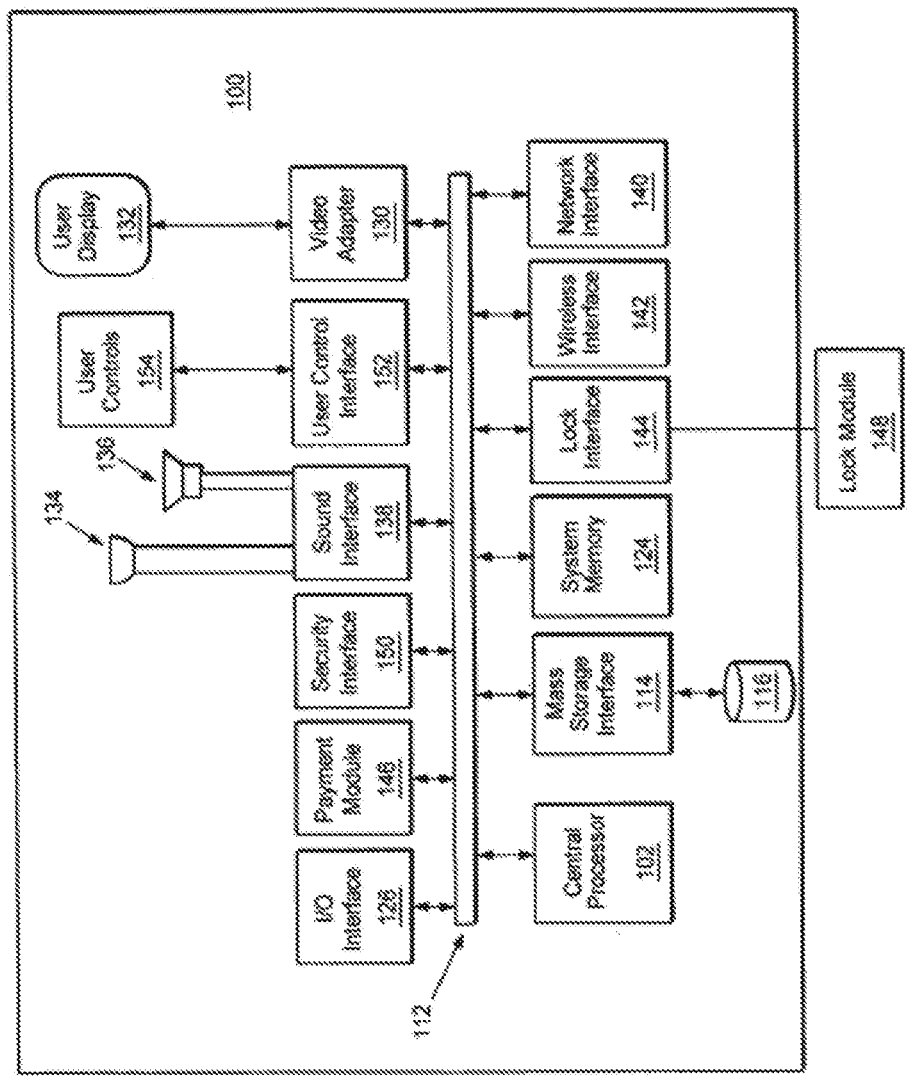
FIG. 1 shows a portable interactive entertainment device and communication connections, in accordance with an exemplary embodiment.

Various exemplary embodiments may be implemented in connection with computer devices and/or systems that exchange and process data. Elements of an exemplary portable interactive entertainment device 100 are illustrated in FIG. 1. Portable interactive entertainment device 100 includes a central processor 102 that controls the overall operation of the device and a system inter-connect bus 112 that connects central processor 102 to the components described below. System inter-connect bus 112 may be implemented with any one or more of a variety of conventional bus architectures. For example, in certain exemplary embodiments, interconnect bus 112 may be implemented with several discrete buses.

Portable interactive entertainment device 100 can include a variety of interface units and drives for reading and writing data or files. In particular, portable interactive entertainment device 100 includes a mass storage interface 114 coupling a hard disk drive 116 to system inter-connect bus 112. Hard disks generally include one or more read/write heads that convert bits to magnetic pulses when writing to a computer-readable medium and magnetic pulses to bits when reading data from the computer-readable medium. A single hard disk drive 116 is shown for illustration purposes only and with the understanding that portable interactive entertainment device 100 may include several of such drives. Furthermore, portable interactive entertainment device 100 may include drives for interfacing with other types of computer readable media such as magneto-optical drives, flash drives, and/or any suitable storage area.

Unlike hard disks, system memories, such as system memory 124, generally read and write data electronically and do not include read/write heads. System memory 124 may be implemented with a conventional system memory having a read only memory section that stores a basic input/output system (BIOS) and a random access memory (RAM) that stores other data and files. Of course, as above, it will be appreciated that any suitable storage area may be used in certain exemplary embodiments.

A user can interact with portable interactive entertainment device 100 with a variety of input devices and/or controllers. FIG. 1 shows an input/output interface 126 that may be coupled to a keyboard, a pointing device, and/or other components. Input/output interface 126 may be implemented with a USB, serial, and/or other type of interface. A user control interface 152 may also be coupled to user controls 154.

Portable interactive entertainment device 100 may include additional interfaces for connecting peripheral devices to system inter-connect bus 112. An IEEE 1394 interface, for example, may additionally or alternatively be used to couple additional devices to portable interactive entertainment device 100. Peripheral devices may include touch sensitive screens, game pads, scanners, printers, and other input and output devices and may be coupled to system inter-connect bus 112 through parallel ports, game ports, PCI boards, or any other interface used to couple peripheral devices to a computer device.

Portable interactive entertainment device 100 also includes a video adapter 130 coupling a display device to system inter-connect bus 112. In the exemplary embodiment shown in FIG. 1, a user display device 132 is used. The display device may include a cathode ray tube (CRT), liquid crystal display (LCD), field emission display (FED), plasma display, or any other device that produces an image that is viewable by the user. User display 132 may also be implemented with a touch screen display. Sound can be recorded and reproduced with a microphone 134 and a speaker 136. A sound interface 138 may be used to couple microphone 134 and speaker 136 to system inter-connect bus 112.

In certain exemplary embodiments, the trim of the handheld may be hard-tooled to injection mold translucent plastic and LEDs may be disposed around at least a portion of the outside of the frame. The colors of the plastic may be chosen to customize the look and feel of the handheld for a particular location (e.g., to bring it in line with trade dress of the location, etc.). Moreover, the color of the LEDs provided around the outside of the handheld also may be chosen to customize the look and feel of the handheld in a similar way. The frame may be formed from a robust, heavy duty plastic in certain exemplary embodiments. For example, a polycarbonate plastic, Norel plastic, or other like kind of plastic may be used. Furthermore, a handle may be provided to the handheld to allow a user to carry it much like a suitcase.

In addition to serving as a transportation-related and or aesthetic feature, the handle and/or at least a part of the frame may help to provide protection to the internal components to make them more resistance, for example, to shocks and/or vibrations. Conventionally, electronics are shock-mounted within the internal scope of the mechanism. For example, isolation is provided at the component level such that, for example, an LCD or hard drive are arranged so as to ride on rubber bushings.

In brief, shock isolating handles (or frames elements) may be used in connection with certain exemplary embodiments to hold the electronics, with these shock isolating handles being the first component to come into contact, for example, with the ground or other surface if the handheld is dropped. Thus, in certain exemplary embodiments, because substantially all components inside the handheld and the front bezel and back housing float within the scope of handles, the brunt of the force may be transferred first to the handle. In this way, a severe shock may destroy the handle, but only a reduced shock would be transferred to the more expensive and more sensitive electronic components.

Figure 2:
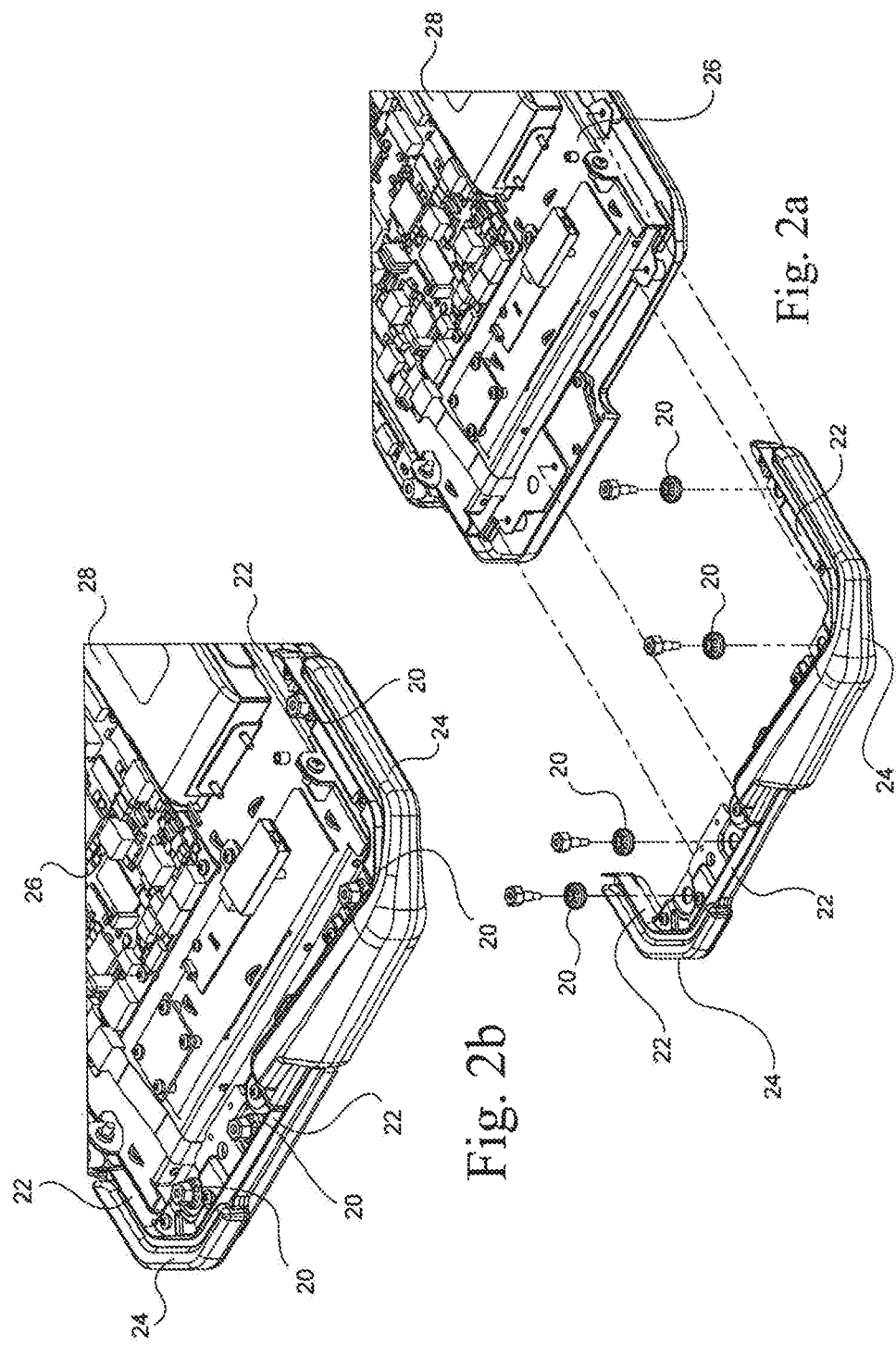
FIG. 2a is a partially exploded view of a handheld device showing certain illustrative shock resistant features in accordance with an exemplary embodiment.
FIG. 2b is a partially assembled view of the handheld device of FIG. 2a in accordance with an exemplary embodiment.

In greater detail, the handles may be mounted with shock isolating grommets (e.g., shock isolating rubber grommets) in a plurality of locations on either or both sides of the electronics components. For example, as shown in FIG. 2a, which is a partially exploded view of a handheld device showing certain illustrative shock resistant features in accordance with an exemplary embodiment, four shock isolating rubber 20 grommets are provided around the edge of the handheld inside the frame 22 and the LED light enclosures 24 on both sides of the electronics board 26. In certain exemplary embodiments, the grommets 20 may be provided at the corners of the frame(s) 22, whereas in certain other exemplary embodiments, the grommets 20 may be provided at opposing corners of the frame 22. As such, the entire assembly and not only just the individual components is shock-mounted within a frame. Conceptually, it is therefore possible to absorb the force of a shock sooner in the impact so as to stop or provide isolation earlier in the impact. It will be appreciated that the grommets of certain exemplary embodiments may be formed from any suitable material and may be disposed at any suitable location within the frame. In certain exemplary embodiments, grommets commercially available by EAR may be used. FIG. 2b is a partially assembled view of the handheld device of FIG. 2a in accordance with an exemplary embodiment.

Certain components within the handheld may be double isolated. For example, the hard drive may be double isolated by suspending it on its own grommets in a similar manner. This may be advantageous because certain components, such as the hard drive 28, may be more susceptible to shocks and vibrations, and more robust protection may be desired. Similarly, the touch screen (not shown) and/or display (e.g., an LCD display, also not shown) may be housed within a metal envelope or housing. Ports on such components may be provided for interface, for example, with other peripherals and/or components within the handheld and thus may extend beyond and/or be accessible through the housing. The whole housing may float on its own rubber grommets mounted to the plastic. In this way, as above, the plastic may absorb shocks first, and then the rubber grommets on which the electronics are floating may absorb secondary shocks.

In certain exemplary embodiments, the display may be a widescreen display. The widescreen display has been found to be popular with end consumers. Games, however, have been designed for the more traditional 4:3 format. Rather than presenting a game in a letterbox, in certain exemplary embodiment, the extra space may be used to present additional information. For example, it may provide advertising content, order status or menu options, game-related information (e.g., scores, status, etc.), device-related information (e.g., credits, battery information, etc.). In connection with multiplayer games, the screen may be divided into more than one areas to show, for example, the progress, status, or other information corresponding to other players. Of course, it will be appreciated that even single-player games often lend themselves to being played by multiple players, with the multiple players playing cooperatively and/or competitively. Therefore, for single player and/or multiplayer games, multiple windows may be displayed on a single device for the multiple players, who may be located at the same location as the primary user or at another location altogether. The displays may be updated via information from a central tower, or direct connections may be established between differently located users. In the latter case, a central server may be consulted by each device to determine the appropriate address for the other device and a direct connection may be subsequently established, for example. Although the foregoing description has been made with respect to widescreen displays, it will be appreciated that the same and/or similar techniques may be applied to the more traditional 4:3 format displays.

The direct connection and/or other features may be facilitated by associating a unique identifier with each unit. In this way, for example, the server will know how to communicate with units, how to connect units within a location, units among locations, etc. Also, a local and/or central server may be able to determine whether a unit is authorized to work at a location based on its identifier. Thus, it may be possible in certain exemplary embodiments to track units wherever they are and, for example, to reduce the chances of units being stolen or taken from one location and improperly used at another.

A significant amount of research, including ergonomic research, has determined that the angle at which the devices are displayed can play a role in usability, performance, and comfort. For example, one particularly advantageous angle at which the device may be positioned is 22.5 degrees behind the perpendicular line extending upward from a flat surface (e.g., table, bar top, or the like). Choosing an appropriate angle may be based on, for example, desired eye lines, touching angles (e.g., for fingers with fingernails), etc. Also, as will be described in greater detail below, the handheld device may be used in connection with a docking station. Therefore, once an angle is chosen, in certain exemplary embodiments the device may be shaped so as to stand alone at that angle and also sit at the same angle when used in connection with a docking station.

Certain exemplary embodiments may be designed so as to operate on a lower power to reduce the amount of heat generated. In such cases, it may be possible to avoid placing fans and/or heat synchs in certain exemplary systems.

One skilled in the art will appreciate that the device connections shown in FIG. 1 are for illustration purposes only and that several of the peripheral devices could be coupled to system bus 112 via alternative interfaces.

Portable interactive entertainment device 100 includes a network interface 140 that may be used to couple portable interactive entertainment device 100 to a local area network (LAN) or a wide area network (WAN), such as the Internet. A wireless interface 142 may also be used to connect to LAN or a WAN. Wireless interface 142 may be configured to communicate with a WiFi network, an infrared remote control and/or a radio frequency remote control.

The operation of portable interactive entertainment device 100 can be controlled by computer-executable instructions stored on a computer-readable medium. For example, portable interactive entertainment device 100 may include computer-executable instructions for transmitting information to a server, receiving information from a server, displaying the received information on display device 132, etc.

Figure 3:
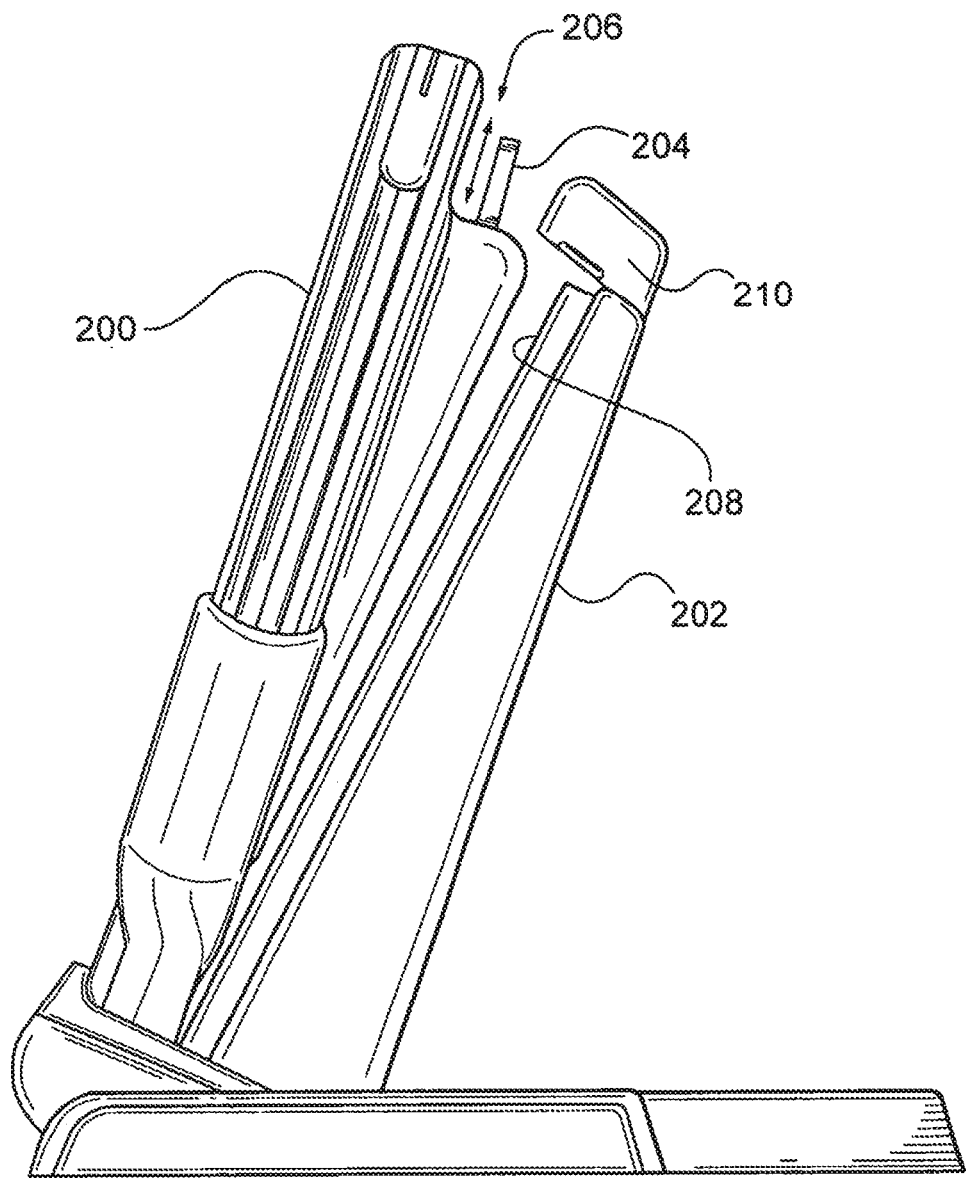
FIG. 3 shows a portable interactive entertainment device removably secured to a stand, in accordance with an exemplary embodiment.

Portable interactive entertainment device 100 may include a locking interface 144. As will be described in detail below, certain exemplary embodiments include portable interactive entertainment system device that may be removably secured to a stand. FIG. 3, for example, shows a portable interactive entertainment device 200 removably secured to a stand 202. A locking pin 204 is mounted within portable interactive entertainment device 200 such that locking pin 204 may move in the directions shown by arrow 206. When locked, portable interactive entertainment device 202 is in contact with a front surface 208 of stand 202 and locking pin 204 extends into a top surface 210 of stand 202. Portable interactive entertainment device 200 may be unlocked, such as when a payment and/or a deposit module 146 receives a credit card payment and/or a deposit, by causing locking pin 204 to move away from top surface 210 of stand 202. Payment and/or a deposit module 146 may include a credit card reader, currency validator, or other mechanism for receiving payment from a customer. Payment and/or a deposit module 146 may be configured to transmit a signal to locking module 144 which then causes locking pin 204 to move. Locking interface 144 may also control the position of locking pin 204 in response signals received from wireless interface 142. For example, wireless interface 142 may receive infrared or radio frequency signals that determine whether portable interactive entertainment device 200 is secured to or unsecured from stand 202. In one implementation a remote control may be used to release a portable interactive entertainment device from a stand. Docking status lights (e.g., that may change from red to green, etc.) may be used, as described below, to indicate that a device is ready to be removed, has been replaced properly (e.g., by changing from blue to red, etc.).

The position of locking pin 204 may be controlled by the combination of a spring and an electromagnet in certain exemplary embodiments. Such components may be incorporated into a locking module 148 (shown in FIG. 1). One skilled in the art will also appreciate that in alternative exemplary embodiments, two or more locking pins may be used to secure portable interactive entertainment device 200 to stand 202. Moreover, one or more conventional mechanisms for removably securing a portable device to a stationary object may be also used.

According to certain exemplary embodiments, three pins may be used to connect individual units to docking stations and/or towers. A first pin may be connected to ground, a second pin may be a charging or power pin, and a third pin may be a control pin. The pins may have, for example, gold contacts or any other suitable contacts. The pins may be positioned on the handheld in certain exemplary embodiments to avoid spillages directly onto the pins, for example, and are thus provided to the handheld in a downward facing configuration.

The pins in certain exemplary embodiments may be disposed such that when the handheld is set into a stand, the ground and power pins make contact first (e.g., before the control pin). No voltage or very little voltage may flow through the plugs when first plugged in. However, when the handheld is set in more fully, the base may sense a resistor sitting in the other unit that turns the voltage on for the unit. In brief, this may help to reduce (and in some cases even prevent) arcing proximate and/or related to the pins, thus preserving the pins via a unique sequencing of connection-related events. The control pin may be short and/or situated so as to make contact with the base last. When the dock senses movement, it may shut the power off, e.g., when someone is trying to improperly remove (such as by pulling it upwardly while still locked), also helping to reduce (or even eliminate) arcing. More particularly, the shorter control pin will come out of contact, thereby causing the power pin to be turned off, when the unit is pulled upwardly while still locked in the stand.

In greater detail, the following steps may be used when removing handheld from dock. A user swipes a credit card. A release signal goes through the handheld, requesting the handheld's release from the docking station. In certain exemplary embodiments, this may involve connecting to a central server for verification and/or validation of the credit card; charging a temporary deposit fee or collecting information in case the device is subsequently damaged, lost, stolen, etc.; and sending back a confirmation of verification and/or validation. Such a signal may be sent back through the control pin. The dock may then sequence a series of solenoids. In certain exemplary embodiments, the dock may sequence a lock solenoid and a slide solenoid and turns the dock's power off. As will be described below, the slide solenoid may be responsible for positioning the handheld relative to the dock, and the lock solenoid may be responsible for locking the slide solenoid in place. The handheld may then be removed. In certain exemplary embodiments, signals may be merely sent down the pins or any other suitable wires, while the main programmed logic circuitry may be located in the dock.

The following steps may be used when returning a handheld to a dock. A timer may runs on the processor of the dock, for example, to determine whether the handheld is present by detecting the presence or absence of the control pin. The control pin may be designed in certain exemplary embodiments so as to have a small pull-up or small positive voltage on the dock. A ground resistor may be provided on the handheld. The dock may perform a divider to determine the status of the control pin. When a voltage of phi/2 is detected on the control pin, it is likely that the handheld present, and the handheld will transfer from A to D. It will be sensed whether the voltage is within half of a supply row and, if so, then the power will be turned on and the removal sequence will be ready to be (re)initiated. In this case, now if the pin goes all the way down to ground, the handheld may be re-released.

Thus, in certain exemplary embodiments, the sequence involves starting at half voltage, turning on the power, and charging the handheld. If the voltage is low, the handheld is released. A signal may be sent to the dock even if the handheld is discharged and the battery is dead in order to turn the dock back on in certain exemplary embodiments. This is one advantage of having the dock provide a small positive voltage, having the handheld provide a ground, and embedding the logic in the dock. An additional advantage is that the handheld will mechanically lock with the dock even if there is no power. This is because the coils are used only for unlocking. Thus, if the power goes out at the location, the units may remain secure in their docks.

Figure 4:
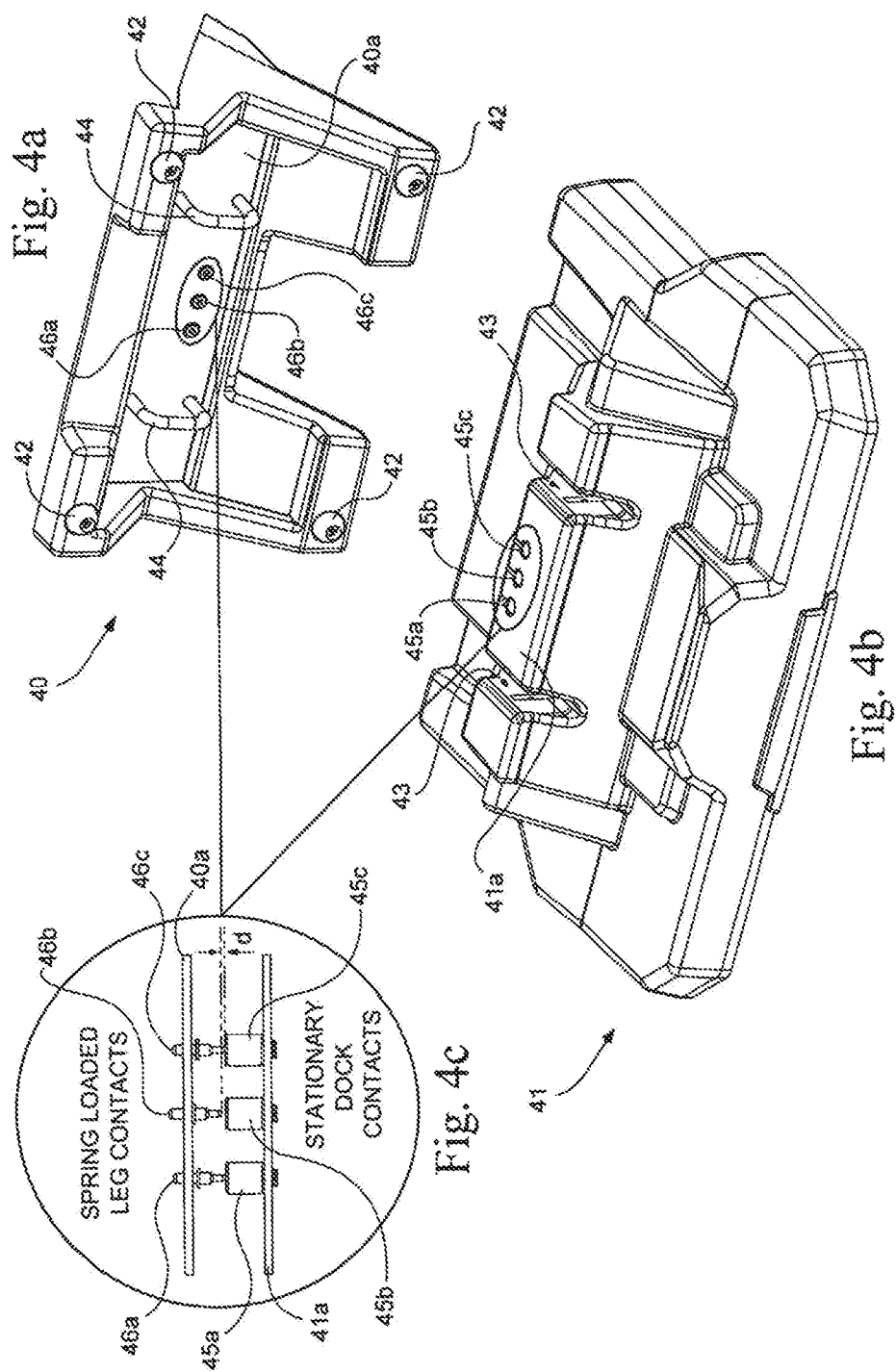
FIG. 4a is a view of the bottom surface of a handheld device in partial perspective in accordance with an exemplary embodiment.
FIG. 4b is a partial perspective view of a docking station in accordance with an exemplary embodiment.
FIG. 4c is an enlarged view of the contacting mechanism shown in FIGS. 4a and 4b in accordance with an exemplary embodiment.

FIGS. 4a, 4b, and 4c illustrate a pin and solenoid locking arrangement in accordance with an exemplary embodiment. In particular, FIG. 4a is a view of the bottom surface of a handheld device 40 in partial perspective in accordance with an exemplary embodiment. A plurality of feet 42 (in this case four feet, although the present invention is not so limited) are provided approximately at the corners of the handheld device 40, for example, to reduce the chances of scratching when the handheld is placed on a table, to provide insulation to the device, etc. Two locking hooks 44 extend downwardly from a flat surface 40a of the bottom of the handheld device 40 such that they are even with or slightly more shallow than the feet 42, for example, to help ensure that the device contacts a flat surface only at the feet 42. Three spring loaded leg contacts (e.g., the pins as described above) 46a/46b/46c also extend downwardly from a flat surface 40a of the bottom of the handheld device 40.

FIG. 4b is a partial perspective view of a docking station 41 in accordance with an exemplary embodiment. Locking channels 43 are formed in the docking station 41 for respectively receiving the locking hooks 44. It will be appreciated that any number of locking channels 43 may be implemented in connection with a corresponding number of locking hooks 44, and that the arrangements depicted in FIGS. 4a and 4b (where there are two such locking channels 43 and two such locking hooks 44) are provided by way of example and without limitation. Three stationary dock contacts 45a/45b/45c are formed in a top surface 41a of the docking station 41 for respectively receiving the three pins 46a/46b/46c.

FIG. 4c is an enlarged view of the contacting mechanism shown in FIGS. 4a and 4b. FIG. 4c shows the stationary dock contacts 45a/45b/45c extending upwardly from the top surface 41a of the docking station 41 as well as the three pins 46a/46b/46c extending downwardly from the flat surface 40a of the bottom of the handheld device 40. In the example shown in FIG. 4c, the middle pin 46b is the control pin and is accordingly shorter than, or at least partially recessed relative to, the other pins 46a/46c by a distance d, such that it contacts its respective dock contact 45b after the other pins 46a/46c contact their respective docks 45a/45c. It will be appreciated that the control pin may be placed in another location in certain exemplary embodiments. Also, it will be appreciated that the present invention is not limited to any particular location of the pins and corresponding contacts. For example, although the pins are shown in a row, the present invention is not limited to this design. Thus, in certain other exemplary embodiments, the pins may be provided in a substantially triangle-shaped or other configuration, for example.

Figure 5:
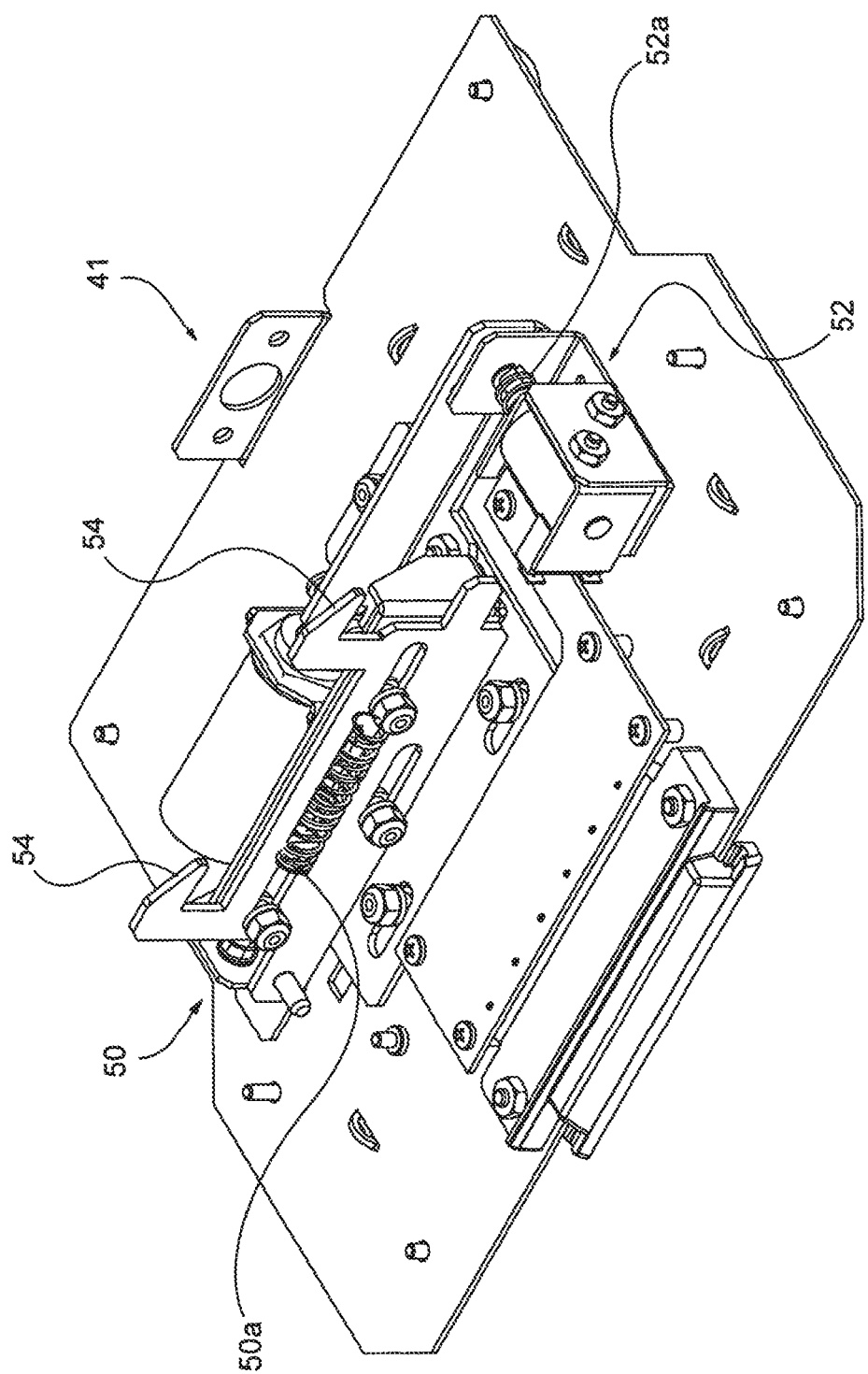
FIG. 5 shows the insides of a bottom portion of a dock for a handheld device in partial perspective view in accordance with an exemplary embodiment.

FIG. 5 shows the insides of a bottom portion of a dock 41 for a handheld device in partial perspective view in accordance with an exemplary embodiment. As noted above, two solenoids are provided, including a slide solenoid assembly 50 having a spring mechanism 50a and a locking solenoid assembly 52 having a spring mechanism 52a. The solenoid assemblies 52, 54 may be arranged so as to work along different axes. In the exemplary embodiment shown in FIG. 5, for example, the solenoid assemblies 52, 54 are perpendicular to each other, although the present invention is not so limited. Protruding upwardly from the slide solenoid assembly 50 are multiple (in this case two) barbs 54. The barbs 54 slide along the first axis and pass through the locking channels 43 and locking hooks 44. Once the handheld device has been inserted into its proper position along the first axis, the locking solenoid assembly 52 engages to keep the slide solenoid assembly 50 in place and to reduce the chances of the handheld device being pulled away without proper authorization. As noted above, some or all of the solenoid assemblies may be electronically operated and, in addition, some of all of the solenoid assemblies may be arranged such that electrical operation is required for removal but not for docking.

A camera may be provided to a handheld device in a cavity formed near the credit card reader at the top of the device. For example, the camera may be configured to take a picture of a user. This picture may be used, for example, to create avatars for players during games or users of jukeboxes, to associate an image of a user with a score (e.g., a high score), for security purposes, etc. The camera may also be able to capture image and/or video so that users may send "live" emails to one another and/or to external users. Similarly, in certain exemplary embodiments, players may be able to see their competition live from within and/or among locations. As described above, in certain exemplary embodiments, a device may contact a central server to determine how to establish a direct connection to another device and then use a direct connection rather than communicating through a server. This may advantageously help reduce delays between devices, reduce the strain on the network in a location and/or among locations, etc. Also, in certain exemplary embodiments, users may create videos and upload them to a server for sharing, use the cameras as virtual photo booths and share through an online interface, etc. In certain exemplary embodiments, as will be described in greater detail below, users may be rewarded for creating custom content, participating in competitions (e.g., at or among and between commercial location(s)) such as media generation competitions, gaming competitions, or sporting competitions, etc.

Additional hardware components may be in wired and/or wireless connection with the device (e.g., an external microphone, musical instruments such as a guitar or drums, etc.) so as to provide additional entertainment features. For example, an external microphone could be used for karaoke within a location or among locations, a guitar could be used to play a "Guitar Hero"-like game, etc. Although most karaoke singing conventionally is done from a central stage or visible area within a location so that it is more like a performance, the camera features provided to the device may be used in connection with the karaoke features. Thus, it may be possible to capture sound and video using a handheld device for transmission to a larger viewable area in the location or across multiple locations. For example, the sound and video may be streamed to one or more locations, captured and sent with a delay, etc.

Some people may be willing to provide collateral in order to use a handheld device. In such a case, a prospective user may hand over to a manager, proprietor, or other authorized employee a credit card, driver's license, and/or other suitable collateral. In certain exemplary embodiments, a remote control may be used to release a handheld device for the user. For example, the person authorized to distribute a handheld device may decide which unit to release and press a button on the remote corresponding to the unit. This may in certain illustrative implementations cause the unit to identify itself (e.g., by causing its LEDs to become activated or behave in a certain manner, for example, changing from red to green, or flashing, etc.). Once the prospective user is ready to take the device and once the authorized person has verified that the unit is the correct unit to be distributed, a second button on the remote may be pushed to actually release the unit to the user.

There is, however, a concern that certain users will not want to give up their licenses and/or credit cards in order to use a handheld device. In cases, as described herein, a user may swipe a credit card at a tower, on a device, etc., in order to release the appropriate unit. This may also be advantageous in that it reduces the need for another person to be present and always responsible for distributing the devices. After a credit card is swiped, the card may be used as collateral, or a refundable deposit may be taken (e.g., similar to at a gas station). The card may be charged in connection with the normal operation of the device and, if there is a problem with the user's use of the device (e.g., damage, theft, loss, etc., to the device), the card may be charged an additional fee.

In certain other exemplary embodiments, a special card (e.g., a smart card, a card with a magnetic stripe, etc.) may be given to users and then swiped at a kiosk similar to a regular credit card. This card may take the form of, for example, a registered player card and can also be used as a debit card if appropriate contact and/or billing information is associated with the card. In these and/or other ways, the location may ensure that credit and/or debit mechanisms are used, rather than cash, to release the devices. This may be advantageous because users often may not have enough cash to cover the costs associated with the harm caused to the device, obtaining cash from a putative user may be difficult, the exact amount of damages may be difficult to determine, etc.

In connection with or in place of a special card, users may become registered users of the handheld device and/or services. They may do so by creating an account and providing certain identifying information. The account may be created using a device or an interface remote from the device (e.g., at a jukebox, on a website, etc.). This information may include, for example, name, address, and contact information (e.g., email address, home address, telephone and/or mobile phone numbers, etc.). The registered user also may be prompted to input optional demographic information, such as, for example, age, sex, race/ethnicity, etc. Any or all of this information may be used, for example, for market research purposes, custom advertising, awards and rewards (e.g., a predetermined number of credits for signing up, promotions, giveaways, etc.), and the like. Information regarding a payment and/or deposit source (e.g., a credit or debit card, bank account number, etc.) may also be collected, e.g., for convenience by, for example, automatic billing when more credits are desired or when a game is played, direct deposit of refunds or promotional rewards, etc. In this and/or other ways, registered users may establish connections between themselves, for example, to communicate with each other (e.g., by sending text, email, handheld-specific messages, etc., for example, indicating a meet-up location, a request to become friends, and the like), share credits among each other, etc. Messages also may be automatically generated for the registered user. For example, a message may be automatically sent to the user if the user no longer retains the high score position on a game. It will be appreciated that this message may be sent via email, SMS, etc.

As alluded to above, member information optionally may be embedded in or associated with a special card. Thus, the registered user may be able to access individualized and/or customized services by sliding this card and/or otherwise identifying its identity to the handheld or other device connected to a common audiovisual and/or game distribution network.

Portable interactive entertainment device 200 and stand 202 may be located in businesses such as bars and restaurants. Portable interactive entertainment device 200 may be configured to allow users, such as customers, to play video games, access menus, send and receive email, access a local area network (LAN), access a wide area network (WAN), pay bills, and/or perform other functions that are typically performed with computer devices.

Regardless of whether a user is a registered user, certain exemplary embodiments may allow tournaments and/or competitions between multiple players using one or more devices. The tournaments and/or competitions may be located within a single location or spread out among multiple locations. When users are competing within a location, colors of the lights on the handheld may be used to indicate members of various teams, competitors, etc. In this way, a user within a location will be able to recognize who that user is competing against as well as who that user is cooperating with. Furthermore, the lights may provide marquis effects for winners/losers, time to take a turn, etc. For example, LEDs (e.g., tri-color LEDs) disposed around the frame of the handheld may flash when it is a particular player's turn, may flash multiple colors in a predetermined or random pattern to indicate a win, etc. The colors also may be tied in to the colors of a central tower, docking station, jukebox, or other hardware device for further attraction of patrons, interactivity, and/or synchronization between devices.

A countertop device or central tower may be integrated with one or more other hardware devices typically found at a location. For example, a countertop device or central tower may be integrated with a jukebox. Often, either one or all of a jukebox, countertop, or central tower will have to be placed in a location away from where most of the "action" occurs, e.g., away from where people order drinks or food, pay for services, perform on stage, etc. Integrating the components may save space and draw more attention to the components individually and together. Indeed, the integrated components may be located at a prime spot in a located, e.g., at a point of purchase in a bar so that the user may even select songs, play a game, order food and drinks, etc., at the same time and even through a single device.

Figure 6:
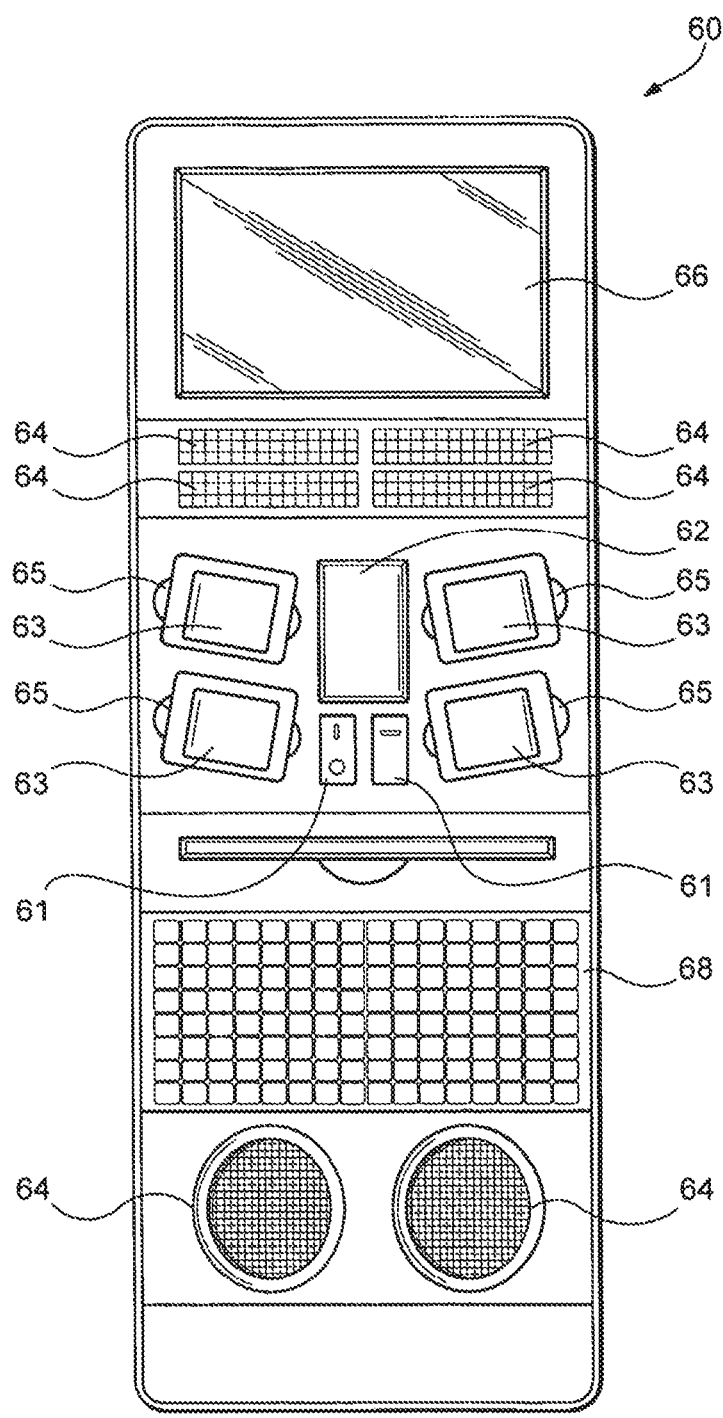
FIG. 6 is an illustrative jukebox showing a plurality of handheld devices removably attached thereto in accordance with an exemplary embodiment.

In certain exemplary embodiments, the integrated device may be designed to look like a familiar device, e.g., a jukebox, to prompt users to use devices with which they have some comfort and will not be intimidated by what might be perceived as complicated user interfaces or technology. FIG. 6 is an illustrative jukebox 60 showing a plurality of handheld devices 63 removably attached thereto in accordance with an exemplary embodiment. The jukebox 60 comprises elements common to digital downloading jukeboxes. For example, it includes various payment and/or deposit acceptors 61 (e.g., a coin and/or bill acceptor, a credit/debit card reader, etc.), a touch screen user interface 62, and a plurality of speakers 64 through which the sound from an instance of media may be played. A large display 66 optionally may be provided to attract users, display information about the songs being played, show a video feed (e.g., a television video feed, etc.), display contest information, etc. A plurality of LED lights 68 may further attract users and may change, for example, in dependence on the instance of media being played by the jukebox 60.

As noted above, plurality of handheld devices 63 may be removably connected to the jukebox 60. They may be stored in ports 65 and may be configured to be released from ports 65 when a valid payment and/or deposit is provided to one or more of the payment and/or deposit acceptors 61. Once a handheld device 63 is removed from the jukebox 60, it may be used as an interface to the jukebox 60, e.g., through a user interface available on the handheld device 63 which may be similar to or different from the user interface provided on the display 62 of the jukebox 60 itself. The handheld device 63 may be in wireless connection, for example, with the jukebox 60. In addition or in the alternative, a handheld device 63 may provide ancillary services in addition to those provided by the jukebox. For example, it may be used to order food and/or drinks, watch television, gamble, play games, etc. Still further, a handheld device 63 may be provided with directional speakers and thus may be used as a jukebox in and of itself for an area within a location. In such a case, the handheld device 63 may have instances of media stored on in its own computer-readable storage medium (e.g., a hard drive, flash drive, USB drive, etc.) itself, may communicate with the jukebox 60 to retrieve and/or stream instances of media, may communicate with a remote server in an audiovisual distribution network (not shown) to obtain further songs, etc. Additionally, users may be charged a premium for accessing certain services via the handheld device 63 such as, for example, when ordering music from the jukebox 60 or a remote server, when watching a television station not currently being shown at the location, when playing a game, etc.

In this way, in certain exemplary embodiments, multiple devices can be integrated to form dedicated jukebox and/or game unit. However, in certain other exemplary embodiments, the integrated devices may be configured to move within a location, for example, when a movable tabletop device and a jukebox are integrated, when a handheld and a jukebox are integrated, etc. In such cases, they may be configured to communicate in a wireless or wired fashion with a local or remote server and/or central audiovisual distribution network to download, queue up, and/or play instances of media (such as songs, videos tec.). This arrangement advantageously may help reduce crowding problems; allow for a more distributed game, jukebox, ordering, and/or other services, e.g., to raise more money and increasing enjoyment by having more and more individuals interact with more and more devices; etc.

Thus, in certain exemplary embodiments, the handheld devices, etc., can be remote jukebox interfaces or individual jukeboxes themselves. In connection with such exemplary embodiments, the devices optionally may be provided with directional speakers, for example, of the type manufactured commercially and to specification by Bose, e.g., so as to reduce the area to which the sound may travel. Thus, handheld devices may provide very local jukeboxes within a location, for example, at the booth or table level, for a pool table or other game, etc. The devices may be pre-located at such positions and/or may be moved among various positions in accordance with the exemplary embodiments described herein. In addition or in the alternative, a headphone jack may be provided to the handheld device and/or a docking location thereof to allow a user to hear sound through headphones. In addition or in the alternative to using the handheld device as a portable and individualized jukebox within a location, the user may play customized music apart form normal jukebox operations (e.g., during a game), thereby supplementing or supplanting the standard audio feed of the operation mode. In one embodiment, the handheld device may include an icon that calls up a jukebox interface that enable handheld device to select songs to play from a jukebox at the location, or from the handheld device itself. In this way, each device can be sued as a jukebox or interface to a jukebox, thereby increasing the convenience for the user and the amount of song plays.

Figure 7:
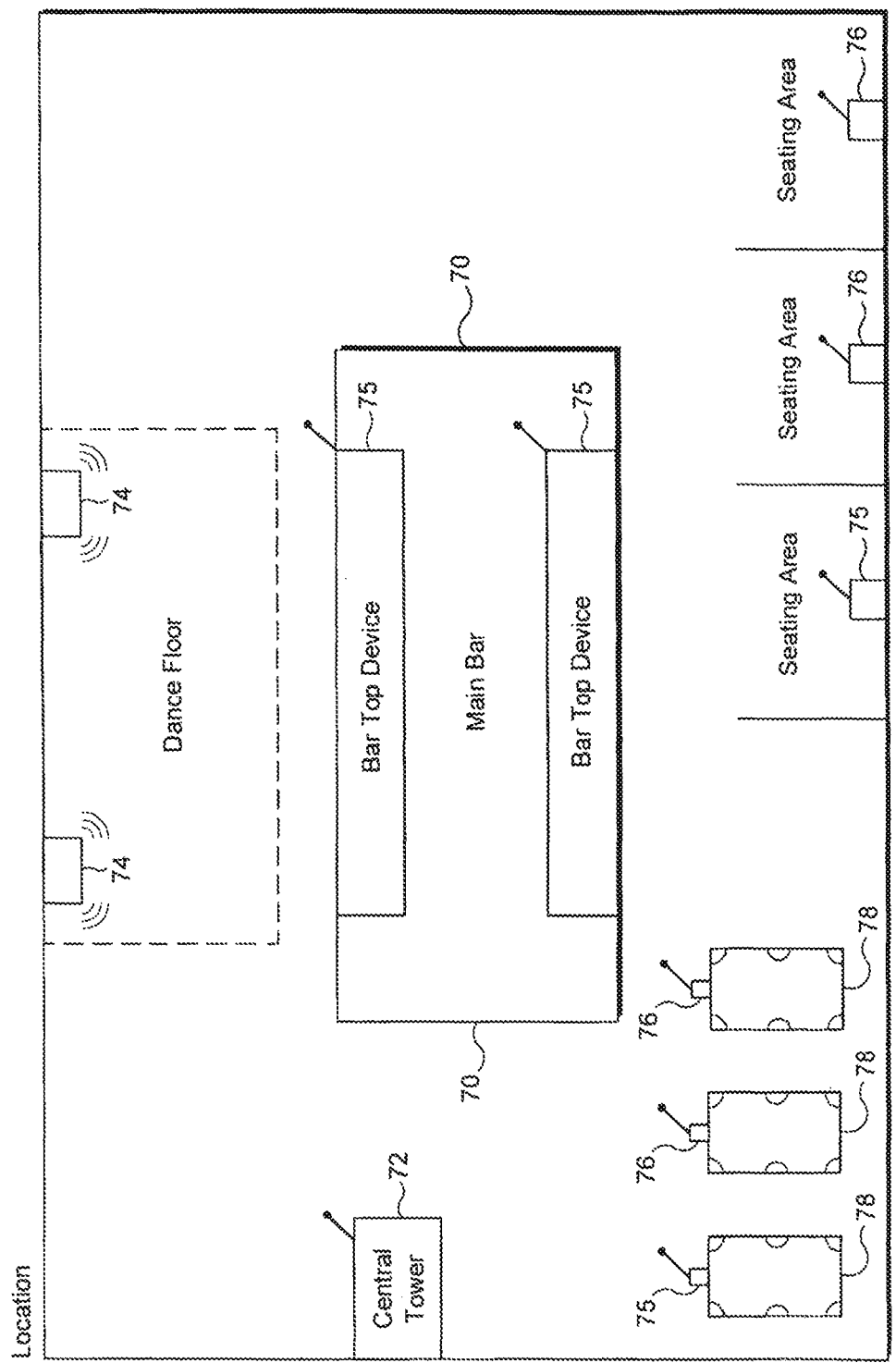
FIG. 7 shows a plurality of handheld devices being distributed throughout a location in accordance with an exemplary embodiment.

FIG. 7 shows a plurality of handheld devices being distributed throughout a location in accordance with an exemplary embodiment. The example of FIG. 7 includes a main bar 70 and a central tower 72, the latter of which may coordinate communications and/or serve as a jukebox. For example, the central tower 72 may be connected to loudspeakers 74 to provide music to a dance floor or first zone within the location. It also may communicate with devices 75. Bar top devices 75 may be located at the bar. These devices 75 may be fixed terminals or they may be removably connected to the main bar 70. Similarly, a fixed device 75 may be provided to a large entertainment area (e.g., pool table 78) and/or among one or more seating areas. Additionally, portable devices 76 may be located and moved and removed throughout many portions of the location (e.g., at pool tables, seating areas, at the bar, etc.). Each device may be used on its own or in a networked environment to provide ancillary services. For example, the devices may be used to play single player or multiplayer games, access the Internet or email, send messages (e.g., email messages, SMS messages, etc.) to others, and the like. Also, the devices may be used as remote interfaces to the central tower 72, e.g., for playing instances of media on a jukebox. Moreover, in certain exemplary embodiments, the devices themselves may be configured to be their own jukeboxes. This may be accomplished by including with the devices speakers (e.g., directional speakers) that are designed to function within a confined area within a location. Thus, for example, handheld devices operating as jukeboxes may be provided or moved to one or more seating areas, game areas (e.g., pool tables, air hockey tables, foosball tables, ping pong tables, darts, etc.), areas of the bar, corners of a room, etc.

In a similar vein, the handheld devices may be provided with a port for receiving a computer-readable storage medium of a user (e.g., a USB drive, a flash drive, etc.) or a portable music playing device (e.g., an iPod, a portable MP3 player, a PDA, a mobile computer, etc.). The port may be, for example, an USB port, a firewire port, a mini-cable port, etc. Cables for connection thereto may be provided by the location and/or by the user, may be retractably stored within the handheld device or base or tower, etc. The handheld device, acting as a jukebox, may be configured to read songs from the computer-readable storage medium and/or the portable music playing device and play them locally (e.g., using the directional speaker exemplary embodiments described above). Similarly, the handheld device, acting as a point of sale and/or licensing intermediary, may be configured to sell instances of media to the user and then transfer such instances of media to a connected device directly. It will be appreciated that this may be accomplished using a licensing architecture similar to that provided in digital downloading jukeboxes.

As one exemplary security measure, the handheld may be programmed to take certain security precautions when it is moved, for example, a predetermined distance from a base, an exit to a location, an unauthorized portion within a location, etc. To determine the locations, for example, RF transceivers may be provided to the location and/or the handheld itself. For example, a determination of position may be based in part on the strength of an RF signal between the handheld and the door, for example. In certain example embodiments, for example, the existence and/or strength of a WIFI connection may also be used as an indicator of position.

Alerts may be provided by the handheld and/or other components within the location. For example, an audible sound from and/or visual display on the handheld and/or at the component (e.g., by a door) may indicate to the user that the user is nearing an inappropriate position. The audible sound and/or the visual display may change (e.g., become more or less intense) as the position of the handheld changes. For example, an audible beeping noise may be emitted when the user is a predetermined distance from the door, and the volume of the beeping may increase as the handheld moves nearer to the door. A strobe light also may be triggered when the user is a predetermined distance from the door.

The combination of an audible alarm and a strobe light at a door is advantageous in certain exemplary instances because a handheld device sometimes may be concealed by a would-be thief (e.g., under a coat) and may be difficult to hear in a crowded and noisy environment and/or where there are multiple exit points. The distances may be customizable and, in certain exemplary embodiments, set as ranges (e.g., start beeping at X ft. from the door, increase Y dB at X/2 feet, etc.).

In addition or in the alternative, in certain exemplary embodiments, the handheld may be programmed to shut down completely and only be programmed to turn back on when it is put into a docking station. This may accomplished through a combination of hardware and/or software, e.g., on the handheld device. For example, when the device is outside of the predetermined distance, warning messages may be provided for the user to give the user a chance to turn around.

In some cases, it may be advantageous to use the above described techniques in connection with a timer. For example, WIFI connections sometimes may be temporarily lost and/or RF signals may become temporarily jumbled. Therefore, a timer may be used to determine whether the device exists outside of a range for a predetermined amount of time before raising an alarm and/or powering down the handheld.

Figure 8:
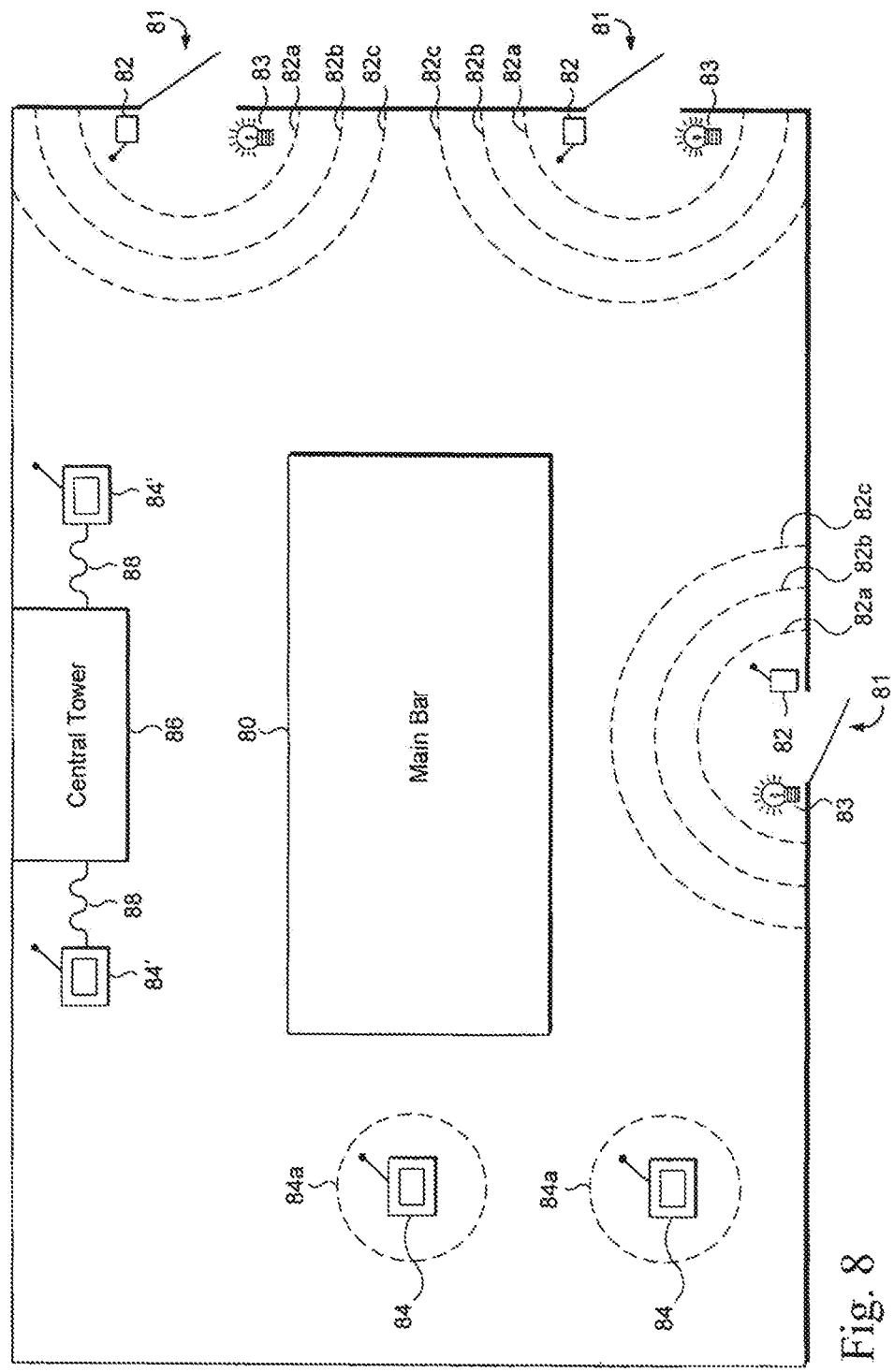
FIG. 8 shows a security system in accordance with an exemplary embodiment.

FIG. 8 shows a security system in accordance with an exemplary embodiment. A main bar 80 may be located in the center of an illustrative location, and multiple entrances/exits 81 may exist at the location. A transceiver 82 (e.g., an RF transceiver) and a strobe 83 may be located at each entrance/exit 81. A plurality of predefined distances 82a/82b/82c may be formed in connection with the signals emanating from the respective transceivers 82. Handheld devices 84 similarly may be equipped with transceivers and therefore may also emanate signals 84a. When the signals from the handheld devices 84 come within a predefined distance of a transceiver 82, an alarm may be triggered in dependence on the proximity to the door. For example, an audible sound may be emitted from the door and/or the device when a handheld device comes within the outermost area 82c. The audible sound may increase in loudness and/or frequency when the handheld device comes within area 82b. When the handheld device is yet closer to the door, the strobe 83 may be activated and the audible alarm may be made yet louder. It will be appreciated that other alarm mechanisms may be used in connection with such embodiments and that the present invention is not limited to any particular number of predefined areas around an entrance/exit. In certain exemplary embodiments, a timer may be used in connection with the security system so that occasional outages of the transceivers and/or accidental venturing into a restricted area does not immediately trigger an alarm. In such cases, the system may wait a predetermined amount of time before triggering an alarm. Also, in certain exemplary embodiments, handheld devices 84' connected to a central tower 86 or other non-movable and secured structure (e.g., a tabletop device, wall, or other element) via a secure tether 88 need not necessarily emanate any signals (e.g., since security is provided by the tether and there may not be a significant risk of the handheld devices being stolen when so secured).

Portable interactive entertainment device 200 may also include a sensor or tag that is used to determine when a user attempts to remove the device from a premises. For example, portable interactive entertainment device 200 may include a radio frequency identification (RFID) tag that causes a reading system to sound an alarm when a user attempts to transport the device through a doorway. A security interface 150 (shown in FIG. 1) may periodically send signals to and/or from an external device to confirm that portable interactive entertainment device 200 is within a predetermined area. Portable interactive entertainment device 200 may be configured to shut down when a security violation occurs. In certain exemplary embodiments, the device may only be restarted when placed in a stand. Portable interactive entertainment device 200 may also be configured to take a picture and transmit the picture to a stand when the device leaves a predetermined area.

Figure 9:
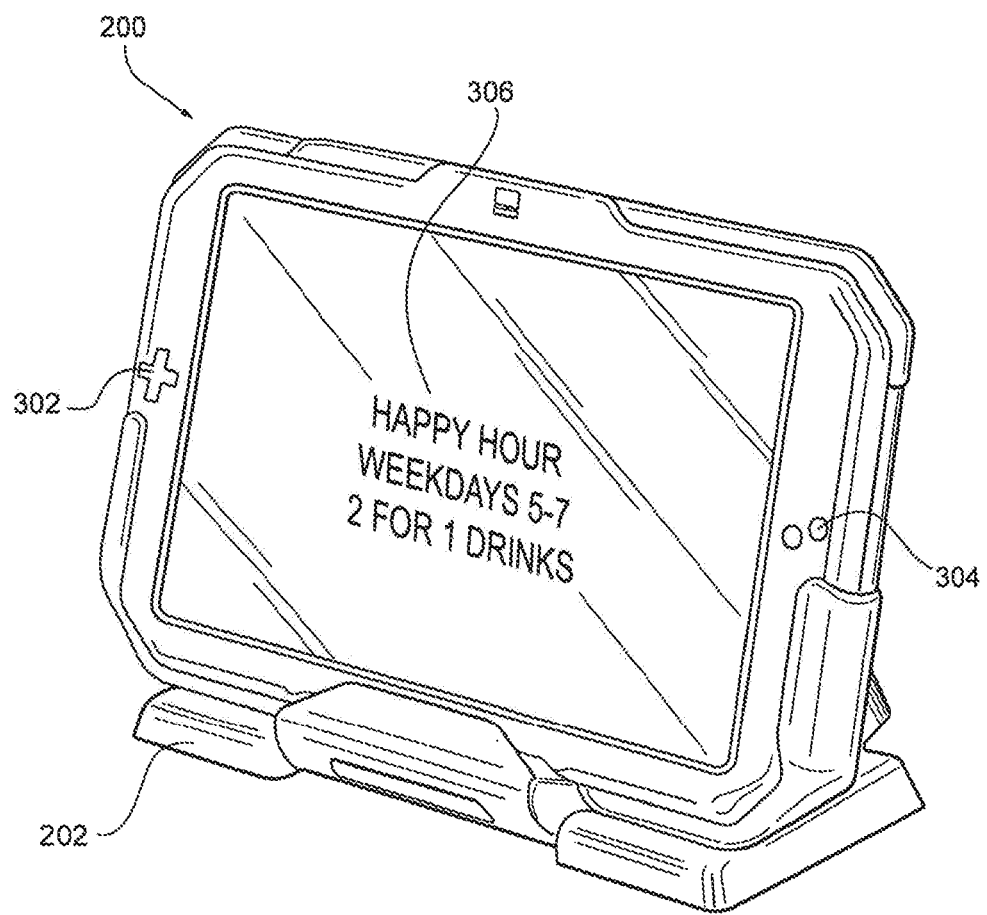
FIG. 9 shows a portable interactive entertainment device secured in a stand, in accordance with an exemplary embodiment of the invention.

FIG. 9 shows a view of portable interactive entertainment device 200 when locked in stand 202. Portable interactive entertainment device 200 may include game controls 302 and 304 that may be used when playing video games or interacting with a graphical user interface. When secured to stand 202, portable interactive entertainment device 200 may be configured to display advertisements, such as advertisement 306. Advertisements may be added locally or via a wide area network, such as the Internet. In certain exemplary embodiments, a group of portable interactive entertainment devices may be connected to a local area network and display coordinated advertisements. Of course, other video and/or audio content such as video game demonstrations, movie trailers, etc. may also be displayed.

Figure 10:
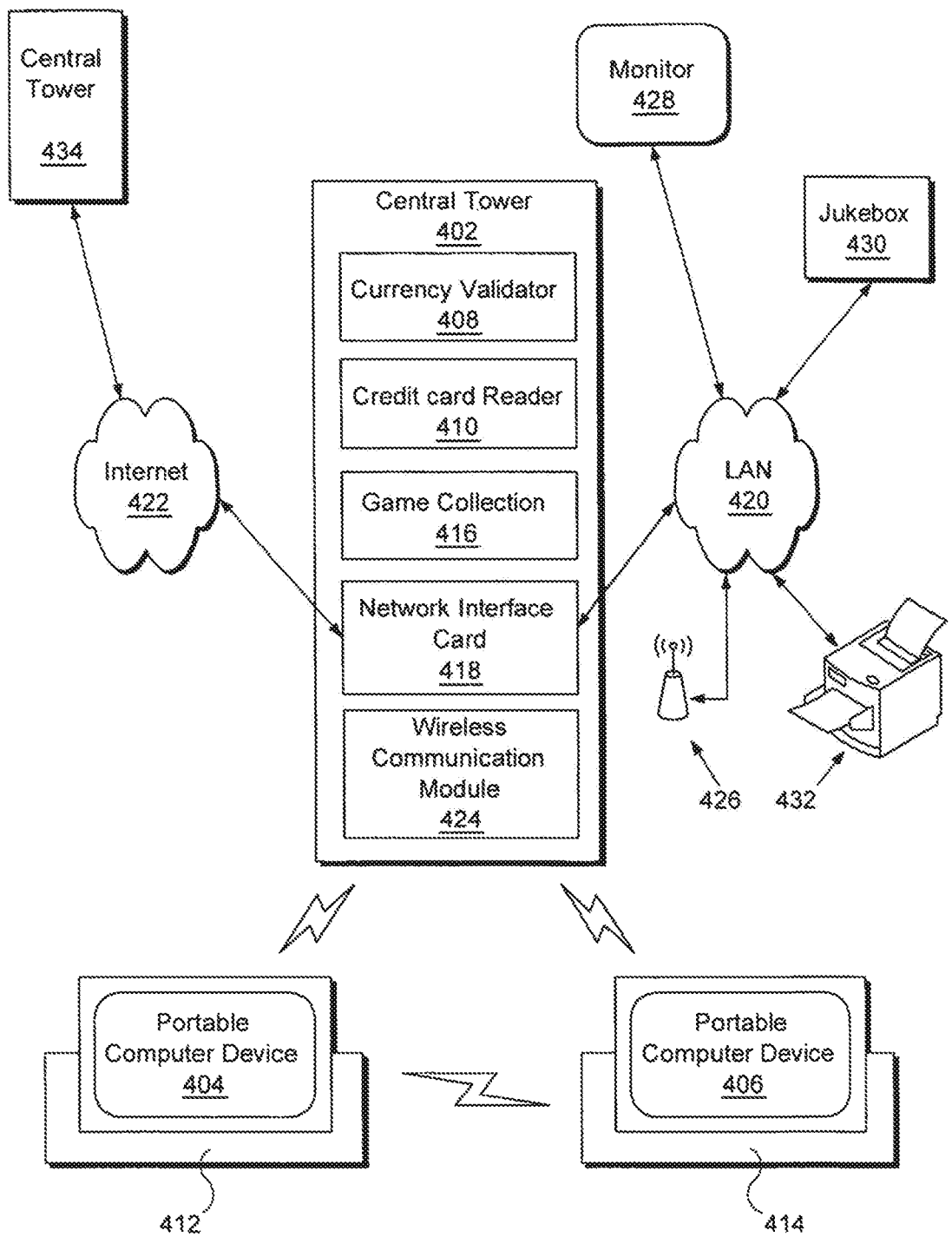
FIG. 10 illustrates a portable coin-operated game system in accordance with an exemplary embodiment.

FIG. 10 illustrates a portable coin-operated game system in accordance with an exemplary embodiment of the invention. One skilled in the art will appreciate that "coin-operated" includes devices that operate by paper and coin currency, as well as devices that operate by credit cards, debit cards, and/or other means for paying for the operation of devices. The system shown in FIG. 10 includes a central tower 402 and two portable interactive entertainment devices 404 and 406. Central tower 402 may be implemented with a computer device that includes a processor, memory, and other conventional computer device components. Portable interactive entertainment devices 404 and 406 may include touch screens and low power processors.

The system shown in FIG. 10 may include additional portable interactive entertainment devices. Portable interactive entertainment devices 404 and 406 may be similar to portable interactive entertainment device 200 shown in FIG. 3. Each portable interactive entertainment device may be removably secured to a stand, such as stands 412 and 414.

Central tower 402 may include a currency validator 408 that may be used to accept currency from users. Central tower 402 may additionally or alternatively include a credit card reader 410 configured to accept payments and/or deposits from credit cards and/or debit cards. Credit card reader 410 may also be configured to read advertisement data from a plastic card having a magnetic strip. In certain exemplary embodiments, the magnetic strip includes the advertisement data. In certain exemplary embodiments, the magnetic strip includes a network address, such as an Internet address, or other pointer that identifies the location of the advertisement.

Currency validator 408 and credit card reader 410 may be configured to provide signals that will result in portable interactive entertainment devices 404 and 406 being released from stands 412 and 414. In one embodiment, stands 412 and 414 are integrated into a single structure. Stands 412 and 414 may also be attached to central tower 402.

Central tower 402 may also included a game collection 416 that stores a variety of video games. In certain exemplary embodiments, games may be retrieved from game collection 416 and transmitted to portable interactive entertainment devices 404 and 406 upon the request of users. The request may include payment and/or a deposit from users to play the games. Central tower 402 may also be configured to host games that are played by users of portable interactive entertainment devices 404 and 406. For example, central tower 402 and portable interactive entertainment devices 404 and 406 may be configured in a client server architecture such that central tower 402 processes game data and data is exchanged between central tower 402 and portable interactive entertainment devices 404 and 406.

A predetermined number of units (e.g., 4, 8, 16, etc.) may be provided to an individual tower. Multiple towers (e.g., 2-4 towers) may be provided per location. They may be spread apart to prevent crowding in a particular area, distribute people more effectively throughout a location, promote team play, etc. In such a case, there may be one master tower and the other towers may function as slaves. For example, one tower may be responsible for connecting to the outside audiovisual and/or game network, for distributing media and/or services within a site, providing accounting functions, etc. In certain exemplary embodiments, a separate device (e.g., a jukebox) may be used as a tower, e.g., by receiving money and distributing credits to devices in a wireless manner. Additionally, the other device's screen (e.g., the jukebox's screen) may be used as an additional game portal.

A network interface card 418 may also be included to allow central tower 402 to connect to a local area network 420 and a wide area network, such as the Internet 422. A wireless communication module 424 may also be included to allow central tower 402 to communicate with local area network 420 and the Internet 422. In one embodiment, one more additional central towers, such as central tower 434 may also be connected to the Internet 422 or another wide area network (WAN) or local area network (LAN). Connecting to additional central towers allows users of portable interactive entertainment devices 404 and 406 to play games, participate in tournaments and communicate with users at other locations, such as other restaurants and bars. In certain exemplary embodiments, portable interactive entertainment devices may be used to view the identification of others who are logged on or in close proximity. Users may also user portable interactive entertainment devices to exchange video game credits. For example, a first person using a portable interactive entertainment device may send a credit to a second person using another portable interactive entertainment device when the first person loses a video game to the second person.

Portable interactive entertainment devices 404 and 406 may also be configured to communicate in a peer-to-peer environment. For example, portable interactive entertainment devices 404 and 406 may be used to play game, exchange instant messages or exchange other types of data. The communication path between portable interactive entertainment devices 404 and 406 may be wireless or wired. In one embodiment, portable interactive entertainment devices 404 and 406 are configured to communicate with LAN 420 via a wireless access point 426.

The system shown in FIG. 10 may include a variety of additional hardware components that may be utilized by central tower 402 and/or portable interactive entertainment devices 404 and 406. For example, a monitor 428 may be attached to central tower 402. Monitor 428 may display video game data so that users of portable interactive entertainment devices 404 and 406 may view video games on a central monitor that may be placed in a bar, restaurant or other establishment. A jukebox 430 may also be connected to LAN 420. In one embodiment, portable interactive entertainment devices 404 and 406 may be configured to request that particular songs be played by jukebox 430. In some embodiments portable interactive entertainment devices 404 and 406 may accept payment in exchange for assigning priority to a song request.

A printer 432 may also be connected to LAN 420 to facilitate printing of documents. In one implementation, a user may review a bill on portable interactive entertainment device 404 and provide a credit card payment to cause printer 432 to print a credit card receipt that will be signed by a customer. In certain exemplary embodiments, printer 432 may be utilized to print e-mail messages, Internet content, images captured by a portable interactive entertainment device or any other content that is conventionally processed by printers.

Portable interactive entertainment devices 404 and 406 may communicate with central tower 402 via a wireless or wired connection. Wireless connections facilitate movement of the portable interactive entertainment devices within a premises.

Figure 11:
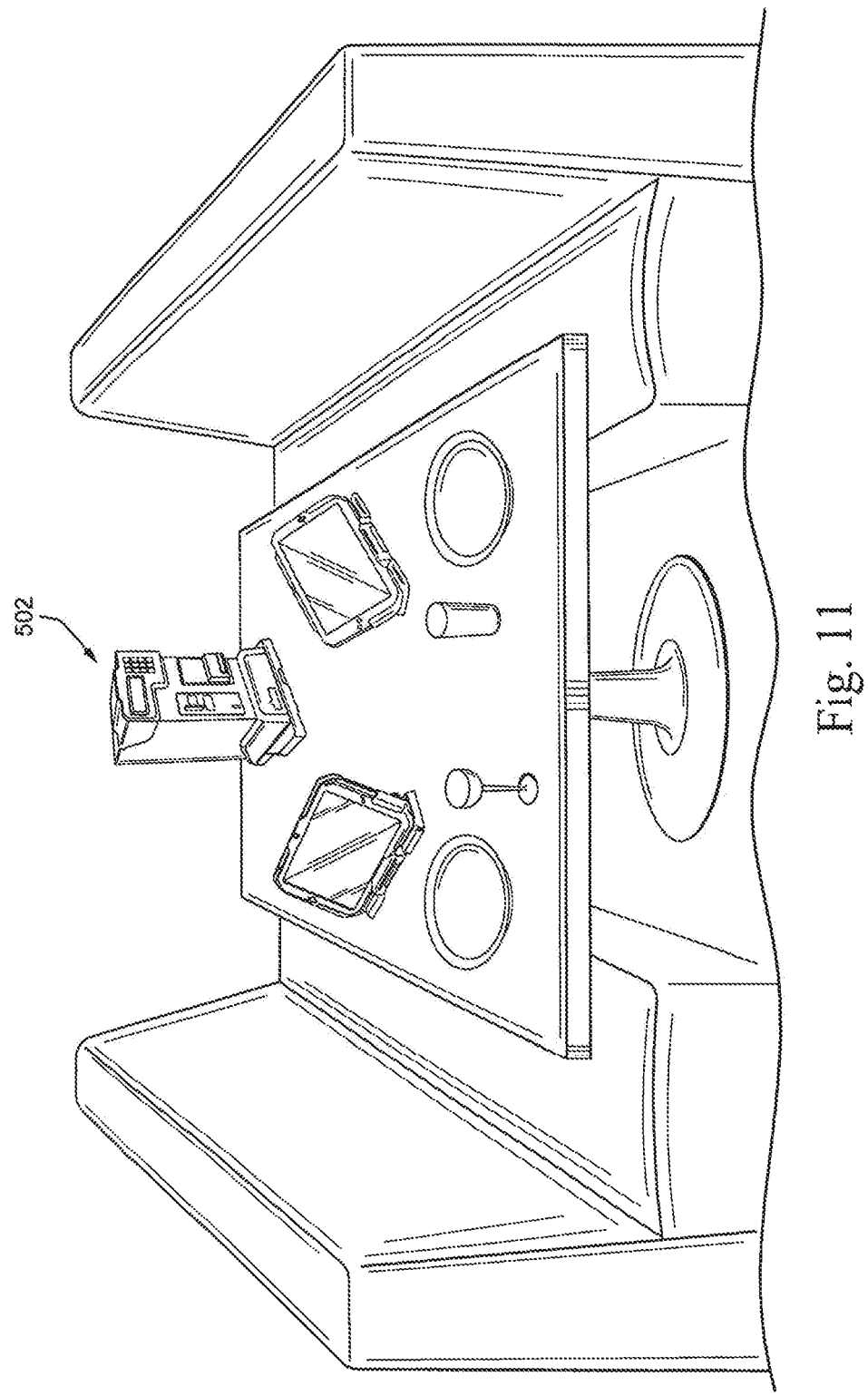
FIG. 11 illustrates another exemplary embodiment in which a central tower and two portable interactive entertainment devices are located at a table in a premises, in accordance with an exemplary embodiment.

A premises, such as a restaurant or bar, may also include an Ethernet connection at some or all of the tables within the premises which allow for a wired connection between portable interactive entertainment devices 404 and 406 and central tower 402. FIG. 11 illustrates an exemplary embodiment in which a central tower 502 and two portable interactive entertainment devices are located at a table in a premises. Other tables may also include central towers and portable interactive entertainment devices. The number of portable interactive entertainment devices may correspond to the size of the table.

Figure 12:
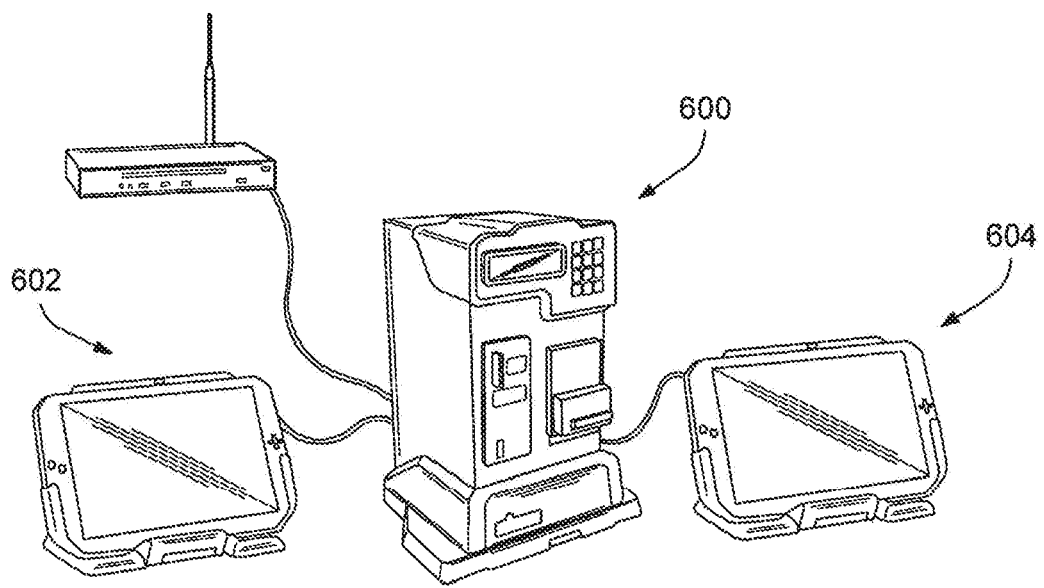
FIG. 12 illustrates an exemplary embodiment in which a central tower is configured to receive payment and/or a deposit and two portable interactive entertainment devices are attached to tethered stands in accordance with an exemplary embodiment.
Figure 13:
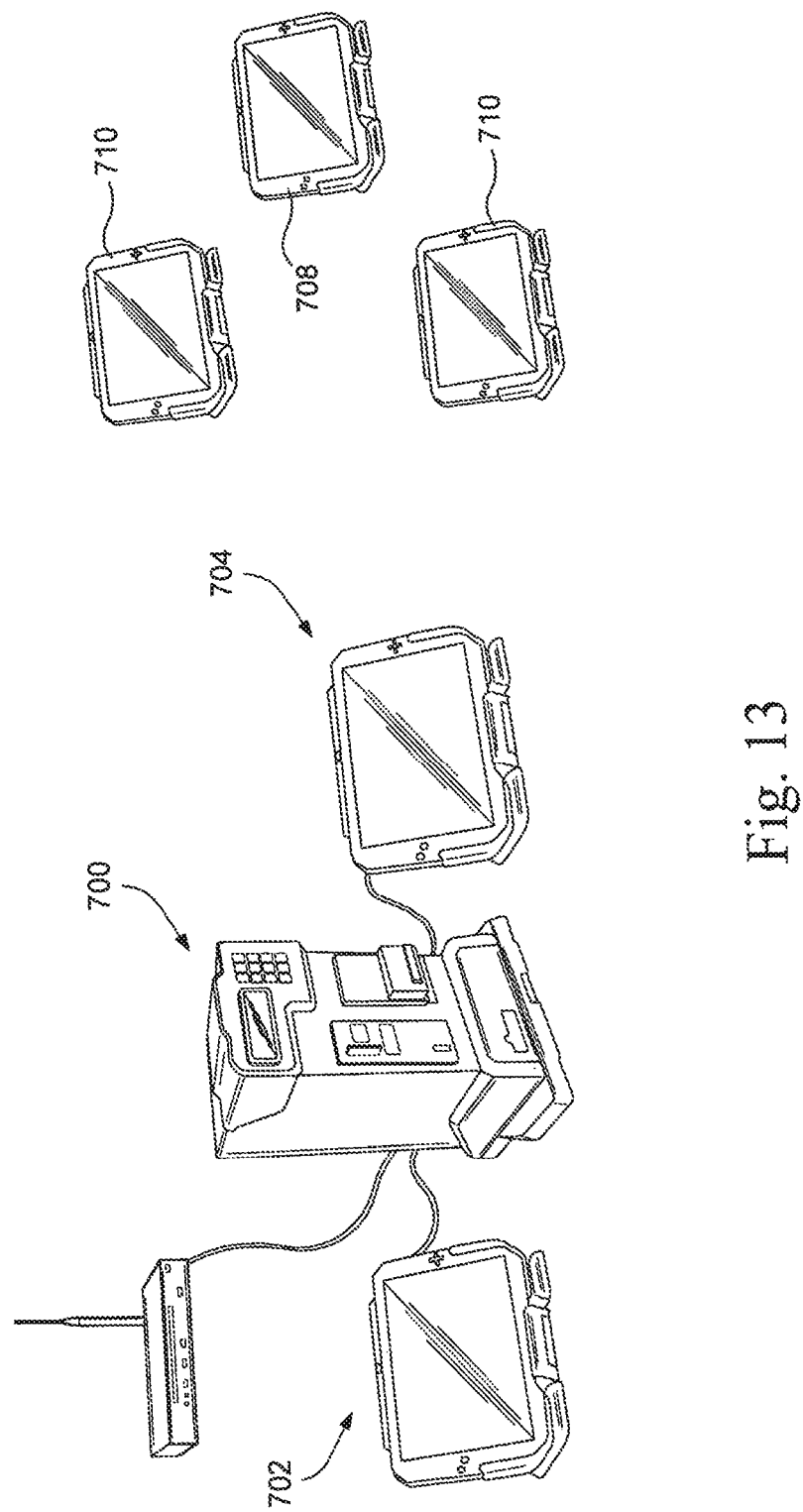
FIG. 13 illustrates an exemplary embodiment in which a central tower is configured to receive payment and/or a deposit and some portable interactive entertainment devices are attached to tethered stands while other portable interactive entertainment devices are attached to stands that are not tethered (or have been removed from such stands for use by a patron), in accordance with an exemplary embodiment.
Figure 14:
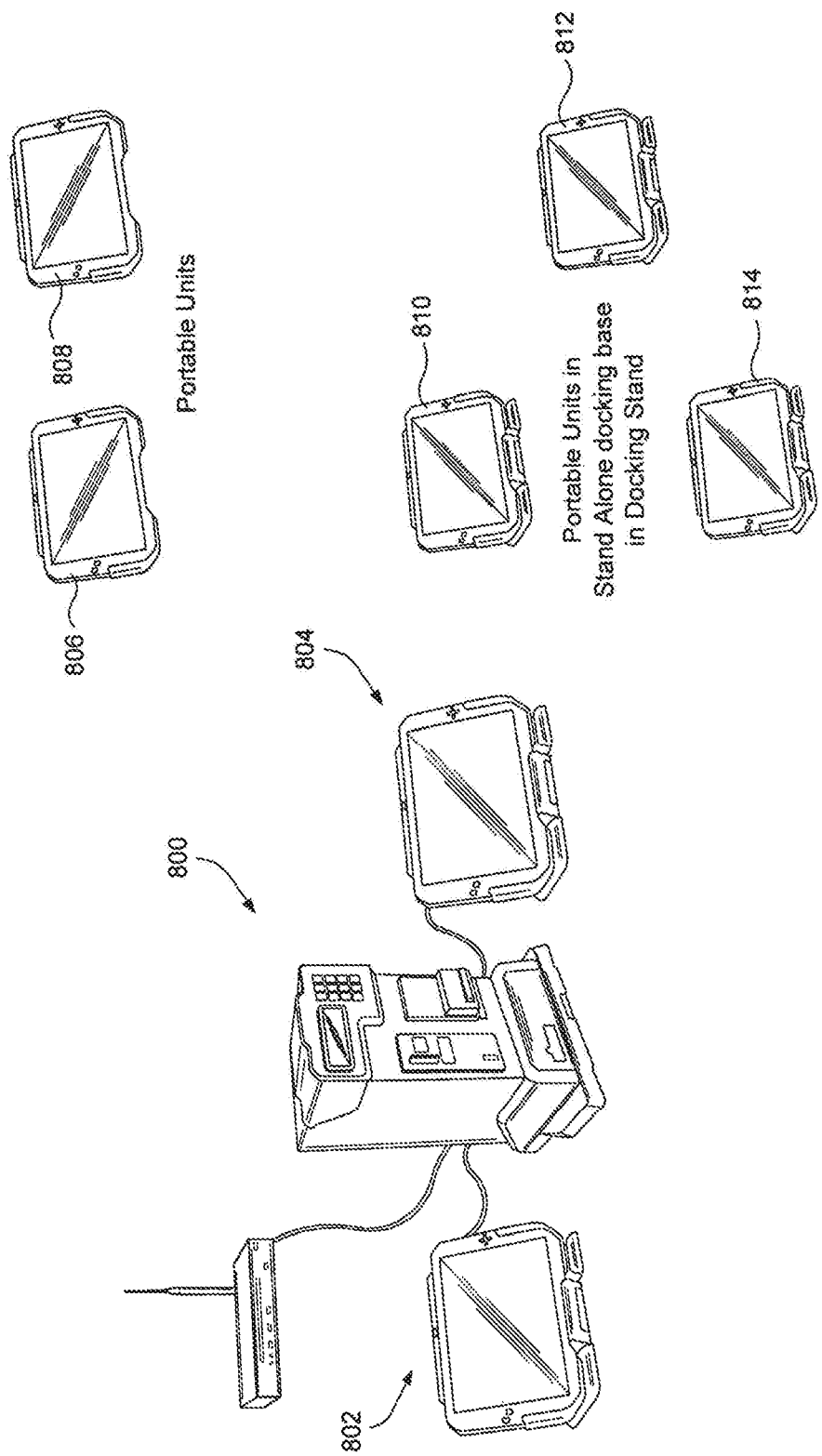
FIG. 14 illustrates an exemplary embodiment in which a central tower is configured to receive payment and/or a deposit and some portable interactive entertainment devices are attached to tethered stands while other portable interactive entertainment devices are attached to stands that are not tethered and accept payment and/or a deposit and some portable interactive entertainment devices which are free standing and not tethered, in accordance with an exemplary embodiment.

Those skilled in art will appreciate that aspects of the invention may be used with a variety of different equipment configurations. FIGS. 12-15 show exemplary configurations that incorporate central towers, tethered stands, stands that are not tethered, external and internal wireless access points, and stand alone portable interactive entertainment devices. FIG. 12 illustrates an embodiment in which a central tower 600 is configured to receive payment and/or a deposit and two portable interactive entertainment devices 602 and 604 are attached to tethered stands. FIG. 13 illustrates an embodiment in which a central tower 700 is configured to receive payment and/or a deposit and some portable interactive entertainment devices 702 and 704 are attached to tethered stands while other portable interactive entertainment devices 706, 708, and 710 are attached to stands that are not tethered. FIG. 14 illustrates an embodiment in which a central tower 800 is configured to receive payment and/or a deposit and some portable interactive entertainment devices 810, 812, and 814 are attached to stands that are not tethered and other portable interactive entertainment devices 806 and 808 which are free standing and not tethered. Portable interactive entertainment devices 810, 812, and 814 may be configured to accept payment. FIG. 15 illustrates an embodiment that includes a group of portable interactive entertainment devices 902, 904, 906, 908, 910, and 912 without a central tower. Each portable interactive entertainment device may be attached to a stand that includes a battery charging unit and a payment acceptor.

As alluded to above, indicators may be provided to indicate the status of a handheld with respect to its being placed in a docked state at a docking location (e.g., a docking station, a table top device, a central tower, another device such as a jukebox, etc.). The indicators may be configured to signal to the user and/or to authorized personnel (e.g., managers, operators, proprietors, etc.) which handheld should be picked up, when it is appropriate to be picked up (e.g., when it is unlocked), whether a handheld is charging, whether a device has been successfully returned to its docked state, etc. In certain exemplary embodiments, the indicators may be colors (e.g., provided by LED lights), icons, sounds, and/or the like, that change in dependence on the status of the handheld vis-à-vis the docking location and the state of either or both of the handheld and the docking location, etc. This may further attract users to the central tower and/or prompt them to inquire about the colorful and/or attractive nature of the devices.

Although the handheld devices may be detachably connected to a base or docking location, they may be tethered to one or more locations in the alternative or in addition according to certain exemplary embodiments. Thus, it may be possible to have an at least partially movable handheld, for example, such that the handheld is detachable from the docking location movable only within the scope of a secured tether. The tethers may act as a security device, as well as provide power to the device.

Certain exemplary embodiments therefore may provide a field-configurable security cable or tether. This may be in the form of an armored cable that links two components allowing them to move within the length of the tether. The tether may be field configurable such that the tether may be added, taken away, or reconfigured at the desire of an authorized user (e.g., manager, proprietor, operator, etc.) and is therefore reusable. In certain exemplary embodiments, the tether may have a universal connector with respect to various components in the system. For example, the tether may be configured to link together any or all of a base, handheld, tower, and a fixed point. In this way, the security provided by the tether can be configured and re-configured in the field in order to meet the desires of a particular location. For example, the tether may be provided between the tower and a charging base, between the tower and handheld, between a fixed element (like a table of floor) and the base, or between a fixed element and the handheld, thus providing great flexibility in configuring (and reconfiguring) the system at a particular location.

FIG. 16 shows how a field-configurable tether 1602 may be used in connection with certain exemplary embodiments. The tether 1602 may be armored, e.g., with a somewhat flexible metal sheathing. Mounting plates 1604 may be provided at opposing ends of tether 1602. Extending through each mounting plate 1604 may be an electrical connection 1606 for providing power among and/or between the various components (e.g., a tower or jukebox 1620, a handheld device 1630, a dock 1640, and/or an element 1650 which may be connected to the floor, a wall, a bar, a pool table, or any other large substantially non-movable or difficult-to-move object). The mounting plates 1604 may have multiple holes 1608 for receiving screws to removably, though securely, connect the tether to the component at a receiving location. It will be appreciated that other fasteners instead of or in addition to screws may be used in certain exemplary embodiments.

A plug 1610 may be provided for aesthetic purposes when a tether is not being used. The plug 1610 may include protrusions 1610*a* for connecting to holes formed in the components in lieu of the ends of the tether 1602.

Each component (e.g., a tower or jukebox 1620, a handheld device 1630, a dock 1640, and/or an element 1650) may have a receiving port 1622 for accommodating the secure tether 1602. As shown perhaps best in connection with the element 1650, the receiving port 1622 may include a hole for receiving power from the electrical connection 1606 provided to the tether 1602. A plurality of holes 1622*b* may be configured to receiving fasteners (e.g., screws or the like) through the corresponding holes 1608 in the plate 1604.

As can be appreciated from FIG. 16, the handheld device 1630 is configured to sit at an angle (e.g., a 22.5 degree angle) whether alone or on a dock 1640. In certain exemplary embodiments, this may be enabled at least in part by providing the handheld device 1630 with a substantially triangle shaped member or leg that extends from the back of the device and sits on a surface. A corresponding piece (e.g., a substantially pyramidal or substantially trapezoidal member) may be provided to the dock and extend upwardly therefrom to provide support and/or a connection between the components, with the base of the dock itself being substantially flush with the surface on which it is placed.

In certain exemplary embodiments, techniques for collecting billing and/or royalty information from a network of connected gaming devices are provided. In connection with such exemplary embodiments, the business model and/or underlying technology for charging operators an amount based on payment inserted (and/or games or instances of media played) on a monthly basis is provided. Additionally, it may be possible to rewards creators of content by collecting information from the gaming device and performing accounting features on such information. Such information may include, for example, information concerning the games played to collect money, licensing to pay royalties to designers, etc. Locations may be charged, in certain exemplary embodiments, per game offered for play, per play of a single game, pay per time, etc. These costs may be passed on to end-users, for example, on a per play, per time, etc., basis.

A network of gaming devices comprising a plurality of gaming devices are connected, in substantially real-time or with a delay, to at least one remote server. The devices are programmed in order to collect and/or upload payment and/or play information to at least one remote server for further processing. The remote server is further programmed in such a way that it can parse the information received from the plurality of gaming devices. Each gaming device is uniquely associated to one patron through the use of a database, such that the patron is billed according to certain business rules associated with the gaming device in the database. Additionally, the system may permit the payment of royalties to right-owners of the game on a per-play model, wherein the right-owners receive moneys for each plays accounted for.

In certain exemplary embodiments, a plurality of players may play a plurality of interactive video and/or entertainment games on a gaming devices. Each gaming device has a unique identifier permitting the unique identification of each game. In an exemplary embodiment, each time a player inserts payment using any of the payment mechanisms the gaming device equipped with, programmed logic circuitry is configured record in a database, log file, memory location, etc. for transmission to the server activity information (including, for example, the amount of payment inserted) as well other additional information (such as, for example, the unique identifier of the gaming device, the identifier of the game played, date and time of play, amount of credits collected for play, etc.).

In certain other exemplary embodiments, each time a game is selected for play, or alternatively each time a game is played, the gaming device may record in a database, log file, memory, etc. for transmission to the server the play activity information, such as, for example, an identifier for uniquely identifying the played game and additional information, such as, for example, the unique identifier of the gaming device, the identifier of the game played, date and time of play, amount of money or credits collected, etc. The play activity information may be as simple as a play count.

In certain exemplary embodiments, the handheld device may then communicate the play activity information and/or the money activity information to the remote server which, in turn, will record the play activity information and/or money activity information associated with the unique gaming device in a database. The recorded information may also be used in conjunction with business rules to establish billing to the operator operating the equipment. For example, once per month billing software can retrieve play activity information and/or money activity information and calculate for each operator the amount due based on the total game plays made by each device or total moneys inserted into each device owned by respective operator. Of course, several business rules may apply; for example, a minimum dollar amount per month per unit can be applied, and each unit may have different business rules depending on the contract associated with the purchase of the unit. For example, operator A may have a gaming device D1 that is billed at 20% of gross money inserted in the unit and gaming device D2 that is billed at 10 cents per game played. If, for example, device D1 earned $100 during the billing period and device D2 played 100 games, the billing system would calculate the total amount due by operator by applying the appropriate business rules to each devices, namely: $100×20%+100×0.10=$20+$10=$30.

In certain exemplary embodiments, play activity information and/or money activity information may be used with the unique game identifier included in the play activity information or money activity information in order to pay a royalty to the game software right owner. For instance, if game #1 is played 100 times on the network and the royalty rate for this game is set at $0.01, $1 would be paid out to the content owner. The system may aggregate payments from multiple games to a single content owner.

Certain exemplary embodiments may be able to calculate the most popular games, the most popular game designers, etc., based on the collected information. This information may be passed on to users, correspond to incentives for developers of content, etc. In addition to creating games, users also may be able to create custom advertisements, media, etc., which may be displayable to other patrons of the bar in certain exemplary embodiments. It will be appreciated that authorized personnel (e.g., at a location, etc.) may wish to screen such advertisements and/or other media creations including games, to make sure that the content is appropriate (e.g., in terms of obscenity and/or decency standards, collection of information, privacy concerns, etc.).

Additionally, locations and/or users may be charged premiums for certain services. For example, certain games may cost more, as may Internet and/or email connections, etc. TV channels and/or other audiovisual content also may be ordered for a premium price in certain exemplary embodiments (e.g., in a case where there are multiple games being broadcast but the user wants to watch a different game from one of the games being displayed on a display at the location, etc.). Other features may include, for example, gambling services, such as the ability to bet on horses. Still further services may be offered for further premiums, including, for example, odds, breeders marks, additional information, etc.

A central tower and/or a separate jukebox may serve as a central payment and/or deposit collection system. Because of the size of a handheld, a credit card reader may be provided thereto, but there typically is not enough room for a conventional bill and/or coin acceptor. Thus, a central tower and/or jukebox may be configured to accept payments and/or deposits in any acceptable form, such as, for example, in cash, credit, debit, etc. Once the money is accepted, credits corresponding to the money may be distributed to and/or shared among and/or between multiple devices. For example, the credits may be distributed among and/or between jukeboxes, handheld devices, etc.

Thus, credits may be shared among and/or between users and/or devices. With respect to the sharing of credits, a connectivity protocol may be established among and/or between jukeboxes and portable devices in certain exemplary embodiments. The credit exchange model may comprise one or more of several distinct techniques, including, for example, a basic credit exchange handling, a remainder handling, and a bonus credit handling. Remainder and bonus credits handling are particularly advantageous for use in connection with gaming systems. Complicated and obscure credit rules management can confuse and frustrate end users, thus making them less inclined to use the system. This is disadvantageous, as many end users are inclined to put additional money into a machine following a special bonus (e.g., money remainder rounded up). Accordingly, in certain exemplary embodiments, there is provided a flexible credit exchange model that is simple to understand and profitable for the relevant parties, including, for example, the hardware providers, proprietors, game operators, and end users.

Credit rules may be defined for jukeboxes and/or gaming systems. By way of example and without limitation, in one implementation, a jukebox may charge 2 credits for $1.00 and provide a bonus credit after $5.00 has been paid, whereas three or four credits may correspond to $1.00 a game.

In a first example, a basic credit exchange handling service is provided by means of a "virtual coin acceptor." For example, a virtual coin acceptor button may be added to a device's interface. Each time the user pushes this button, 1 monetary unit is inserted in a predefined function (e.g., the jukebox function) of the device for a given currency denomination (e.g., $0.25) from the money available on the device as a whole. Because the money is inserted consciously by the user's action in the jukebox, all of it must be used within jukebox sessions. This basically works like a real coin acceptor, in that money can be inserted but not removed. The other money may be used for other services.

Thus, there is flexibility in allowing credit exchange between different sets of credit rules. The concept is simple to understand, in that an exported jukebox works in the same way as a typical floor or wall unit. The credit exchange is simple because it is based on a predefined monetary unit (e.g., $0.25). Credit rules and/or bonuses may apply on the device the proper way, because all money sent to a particular function will be spent on it.

In certain exemplary embodiments, users may be allowed to browse the contents (e.g., instances of media or games available for play) before deciding how much they want to spend. Moreover, multiple credit rules may be applied for a different function or different functions for the remaining money after delegation to the first function is terminated. In certain exemplary embodiments, allocations to different functions may be made at the same time.

Such techniques may result in unusable remainders. These remainders may be handled according to certain exemplary techniques.

In a first exemplary technique, rounding up may be provided via a function (e.g., a popup menu) upon the insertion of additional payment. In such a case, credits may be converted following basic credit handling process. This conversion may produce unusable remainders (e.g., a credit rule is set to 3 credits for $1.00 on a gaming system). At the end of a jukebox session, for example, a function may appear with a timer offering the user to add money so that the system rounds up any unusable remainder he has left. If the user does not add money, the remainder may be discarded by the system. Of course, it will be appreciated that the function could be presented at other times, such as, for example, when a song has finished playing, after a game is ended, etc.

According to this exemplary technique, users may not have to "lose" any money, since unusable remainders are rounded up. This may keeps users playing with the system, thus increasing their monetary contributions. It will be appreciated that operators may have to adjust rounding up rules based on, for example, an analysis of user behaviors including how much rounding is sufficient to prompt additional insertion of money, location and/or operator tolerance for giving away free credits, etc.

In a second exemplary technique for rounding up, credits may be automatically rounded up to a fixed monetary unit. In such a case, credits may be converted following a basic credit handling process. This conversion may produce unusable remainders (e.g., when a credit rule is set to 3 credits for $1.00 on a device). On the device, after credit rules are reapplied, any unusable remainder may be rounded up to a previously fixed monetary unit (e.g., $0.33). This solution may provide a simple way of having a controlled round up process for unusable remainders possibly generated by a session of the device. It could also be used with a threshold for more control over the total cost of these "gifts" in certain exemplary embodiments.

According to this exemplary technique, users may not have to "lose" any money, since unusable remainders are rounded up. The solution is flexible, as each device provider can apply its own monetary unit and threshold of choice. As above, it will be appreciated that operators may have to adjust rounding up rules based on, for example, an analysis of user behaviors including how much rounding is sufficient to prompt additional insertion of money, location and/or operator tolerance for giving away free credits, etc.

The following is an example scenario of this technique presented by way of illustration and without limitation. In this example scenario, the credit rules are: 3 credits are provided for $1.00 on the game unit, therefore corresponding a fixed monetary unit for rounding up at $0.33; and at the jukebox, 2 credits are provided for $1.00. There is automatic rounding up to a fixed monetary unit without a threshold in this example. A patron puts $2.00 into a gaming unit, and receives 6 credits with each credit being worth $0.33. The patron plays 1 game for 1 credit, leaving $1.66 in the gaming unit. A song is played at the jukebox for 1 credit at a cost of $0.50. At the gaming unit, $1.16 is now available. The system rounds up this amount to the fixed monetary unit ($0.33), requiring the operator to give $0.17. Now, the end user has $1.33, or enough for 4 credits.

The monetary impact of fictional rounding up scenario will now be provided using the same example credit rules provided above. Table 1 indicates the plays done via gaming interfaces in July 2007, on some 1432 jukeboxes.

TABLE 1

Plays done via game unit - distribution

| Month | Number of plays done via gaming systems | Number of jukeboxes |
|---|---|---|
| July 2007 | 1 to 100 plays | 725 |
| July 2007 | 101 to 500 plays | 559 |
| July 2007 | 501 to 1000 plays | 95 |
| July 2007 | 1001 to 1500 plays | 36 |
| July 2007 | Greater than 1500 plays | 17 |
| Total jukeboxes with "game" plays in July 2007 | | 1432 |

Based on the above information, the following fictional "exploit" scenario is provided. The following two behaviors are less than optimal because it will always generate a remainder of $0.16 forcing the operator to give $0.17 after each song is queued. First, always return to the jukebox when at least one game has been played. Second, always queue only one song at a time and go back to the gaming interface. Table 2 shows the total cost of the rounding up process according to the number of plays and this disadvantageous "exploit" behavior.

TABLE 2

| Number of plays done via gaming systems | Cost for the operator when rounding up |
|---|---|
| 1 | $0.17 |
| 25 | $4.25 |
| 50 | $8.50 |
| 75 | $12.75 |
| 100 | $17.00 |
| 200 | $34.00 |
| 300 | $51.00 |
| 400 | $68.00 |
| 500 | $85.00 |
| 1000 | $170.00 |
| 1500 | $255.00 |

The example above is based on typical pricing mixed with exploit habit on end user's side. The total cost of the rounding up process very much depends on the fixed monetary unit for rounding up, the possible threshold, the behavior of the end users and the number of uses of the jukebox from the gaming interface. It will be appreciated that a more advantageous exploit scenario may be established based on these and/or other factors.

A technique for handling bonus credits will now be described wherein there is persistence of BONUS CREDITS WORTH $0.00. In such a case, instead of distributing the value of bonus credits over total credits thus reducing the value of each credit individually, the credit rules may remain unchanged and supplemental bonus credits worth $0.00 may be registered in the gaming system. Because bonus credits are not worth any money, they may never be transferred to the device via the virtual coin acceptor. Hence, patrons may be able to go to the device and come back without losing bonus credits.

The following provides an example scenario wherein this technique is used. The following credit rules are applied: for a game device, 4 credits may be purchased for $1.00, and 5 bonus credits may be awarded after $5.00 has been paid in; at the jukebox, 2 credits may be purchased for $1.00, and bonus 12 credits may be awarded after $5.00 has been paid in. In the scenario, a patron inserts $5.00 into a gaming unit. The patron receives 25 credits—20 credits worth $0.25 each, and 5 bonus credits worth $0.00 each. The patron pays 2 credits, costing $0.50. The patron now has 18 credits worth $4.50 and still has 5 bonus credits worth $0.00. The patron goes to the jukebox with $4.50 while the bonus credits are persisted on the gaming unit. The patron plays 1 song, costing $0.50. The patron now has $4.00 at the jukebox. The patron returns to the gaming unit. The credit rules are reapplied on the $4.00 left, meaning that the patron now has 16 credits. The persisted bonus credits are reapplied, so that the patron now has 16 credits and 5 bonus credits for a total of 21 credits. In sum, then, the patron went to the jukebox having 23 credits and came back with 21, keeping his bonus.

This may be contrasted with a distributed value technique, where each credit is worth money. In a similar situation, a patron puts $5.00 into a gaming unit. The patron receives 25 credits, with each credit worth $0.20. He pays 2 credits at a total cost of $0.40. The patron now has 23 credits worth $4.60. The patron goes to the jukebox with $4.60 and plays 1 song, costing 1 credit or $0.50. The patron now has $4.10. The patron returns to the gaming unit. The patron no longer has the $5.00 in credits required to access the bonus credit rule. When the credit rules are reapplied on the $4.10, 16 credits are awarded with a remainder of $0.10. This remainder optionally may be rounded up, providing the patron with 17 total credits. In this case, the patron went to the jukebox with 23 credits and came back with only 17 after only a single play at the jukebox. The patron therefore disadvantageously lost his bonus.

Contrasting these two examples, it can be seen how the technique for handling bonus credits wherein there is persistence of BONUS CREDITS ACCORDING TO CERTAIN EXEMPLARY EMBODIMENTS PROVIDES NO EXTRA COST FOR THE LOCATION OR OPERATOR BUT PROVIDES THE PATRON WITH AN INCREASED VALUE.

It will be appreciated that other applications may be provided in a manner customized for the particular location. For example, such applications may include the receipt of job applications, taking of surveys, training, cash register services, and/or the like.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. An interactive entertainment system provided in a venue comprising:
a central audiovisual data reproduction device including a non-transitory computer-readable storage medium and a processor configured to reproduce audiovisual data in accordance with user inputs;
a plurality of stands distributed within the venue;
a plurality of portable interactive entertainment devices operable independently of one another, each of the portable interactive entertainment devices comprises:
a lock configured to removably secure the portable interactive entertainment device to one of the plurality of stands,
a display,
a payment acceptor configured to accept payment from a user,
a communication interface configured to send and receive data to and from other portable interactive entertainment devices and/or the central audiovisual data reproduction device, and at least one processor configured to:
cause a user interface to be displayed on the display, and
in response to inputs to the user interface, enable selection of instances of media for playback via the portable interactive entertainment device and/or the central audiovisual data reproduction device in exchange for credits.

2. The interactive entertainment system according to claim 1, wherein the central audiovisual data reproduction device is a jukebox device at least partially controllable to play audiovisual data stored thereon in response to instructions from one or more of the plurality of portable interactive entertainment devices.

3. The interactive entertainment system according to claim 1, wherein the plurality of stands are connected with the central audiovisual data reproduction device.

4. The interactive entertainment system according to claim 1, wherein the at least one processor of the portable interactive entertainment device is further configured to:
accept payment from the user, and
in response to the payment from the user, unsecure the portable interactive entertainment device from one of the plurality of stands distributed within the venue.

5. The interactive entertainment system according to claim 1, wherein the plurality of portable interactive entertainment devices are remote interfaces of the central audiovisual data reproduction device.

6. The interactive entertainment system according to claim 1, wherein the central audiovisual data reproduction device is connected to one or more speakers to provide music to at least an area of the venue.

7. The interactive entertainment system according to claim 1, wherein the central audiovisual data reproduction device further comprises a communication interface configured to transmit and receive data to and from the plurality of portable interactive entertainment devices.

8. The interactive entertainment system according to claim 1, wherein each of the plurality of portable interactive entertainment devices comprises a port configured to receive a computer-readable storage medium of the user or a portable audiovisual data reproduction device.

9. The interactive entertainment system according to claim 7, wherein the at least one processor is configured to read audiovisual data from the computer-readable storage medium and/or the portable audiovisual data reproduction device and reproduce the audiovisual data locally.

10. The interactive entertainment system according to claim 7, wherein the port is an USB port, a firewire port, and/or a mini-cable port.

11. The interactive entertainment system according to claim 1, wherein each of the plurality of portable interactive entertainment devices comprises a security interface configured to periodically send signals to and/or from an external device to confirm that the portable interactive entertainment device is within a predetermined distance from the external device.

12. The interactive entertainment system according to claim 1, wherein the communication interface of the portable interactive entertainment device is configured to wirelessly transmit and receive data to and from the other portable interactive entertainment devices and/or the central audiovisual data reproduction device.

13. A non-transitory computer-readable storage medium having stored therein an information processing program for execution by a portable interactive entertainment device comprising a lock configured to removably secure the portable interactive entertainment device to one of a plurality of stands separately distributed within a venue, a processor operatively coupled to a display, a communication interface, the information processing program comprising instructions that, when executed by the processor, causing the portable interactive entertainment device to perform operations comprising:
accepting payment from a user,
in response to the payment from the user, unsecure the portable interactive entertainment device from the stand to which the portable interactive entertainment device is secured,
causing a user interface to be displayed on the display,
accepting inputs from the user via the user interface,
in response to the inputs to the user interface, enabling the user to select instances of media for playback remotely via a central audiovisual data reproduction device provided in a venue in exchange for credits, and
transmitting instructions corresponding to the inputs to the central audiovisual data reproduction device to cause the central audiovisual data reproduction device to playback the instances of media selected by the user,
wherein the central audiovisual data reproduction device includes a non-transitory computer-readable storage medium and a processor configured to reproduce audiovisual data stored thereon.

14. The non-transitory computer-readable storage medium according to claim 12, wherein the central audiovisual data reproduction device is a jukebox device at least partially controllable to play audiovisual data stored thereon in response to instructions from one or more of the plurality of portable interactive entertainment devices.

15. The non-transitory computer-readable storage medium according to claim 12, wherein the stand is connected with the central audiovisual data reproduction device.

16. The non-transitory computer-readable storage medium according to claim 12, wherein the plurality of portable interactive entertainment devices are remote interfaces of the central audiovisual data reproduction device.

17. The non-transitory computer-readable storage medium according to claim 12, wherein the information processing program further comprises instructions that, when executed by the processor, causing the interactive entertainment device to, via a port, receive data from an external computer-readable storage medium of the user and/or an external portable audiovisual data reproduction device and reproduce the data locally.

18. The non-transitory computer-readable storage medium according to claim 16, wherein the port is an USB port, a firewire port, and/or a mini-cable port.

19. The non-transitory computer-readable storage medium according to claim 12, wherein the information processing program further comprises instructions that, when executed by the processor, causing the interactive entertainment device to periodically send signals to and/or from an external device to confirm that the portable interactive entertainment device is within a predetermined distance from the external device.

20. The non-transitory computer-readable storage medium according to claim 12, wherein the information processing program further comprises instructions that, when executed by the processor, causing the interactive entertainment device to wirelessly transmit and receive data to and from other portable interactive entertainment devices and/or a central audiovisual data reproduction device.

* * * * *